United States Patent [19]

Maeda et al.

[11] Patent Number: 5,008,854
[45] Date of Patent: Apr. 16, 1991

[54] POCKET SIZE DATA STORAGE APPARATUS WITH TABLET DEVICE FOR INPUTTING IMAGE DATA

[75] Inventors: Junichi Maeda; Tsuguo Yanai; Kazuto Yamamoto; Yuji Kuriyama; Haruo Yamamoto, all of Tokyo, Japan

[73] Assignee: Casio Computer Co., Ltd., Tokyo, Japan

[21] Appl. No.: 423,604

[22] Filed: Oct. 16, 1989

Related U.S. Application Data

[63] Continuation of Ser. No. 235,709, Aug. 19, 1988, abandoned, which is a continuation of Ser. No. 946,712, Dec. 24, 1986, abandoned.

[30] Foreign Application Priority Data

Jun. 19, 1986 [JP] Japan .............................. 61-93502[U]

[51] Int. Cl.$^5$ .............................................. G06F 3/02
[52] U.S. Cl. ..................................... 364/900; 364/927; 364/963; 364/705.06; 364/709.01; 364/709.04; 364/709.11; 340/706
[58] Field of Search ................... 364/705.01, 705.06, 364/709.01, 709.02, 709.03, 709.04, 709.11, 709.12, 709.13, 709.14, 710.11, 710.14, 518, 521, 188, 190, 200, 900; 340/706, 712; 382/13

[56] References Cited

U.S. PATENT DOCUMENTS

| | | | |
|---|---|---|---|
| 3,959,585 | 5/1976 | Mattes et al. | 178/18 |
| 3,999,050 | 12/1976 | Pitroda | 235/152 |
| 4,117,542 | 9/1978 | Klausner et al. | |
| 4,129,747 | 12/1978 | Pepper, Jr. | 178/19 |
| 4,276,541 | 6/1981 | Inoue et al. | 364/900 X |
| 4,279,022 | 7/1981 | Abe | 364/900 |
| 4,318,096 | 3/1982 | Thornburg et al. | 340/706 |
| 4,389,711 | 6/1983 | Hotta et al. | 364/556 |
| 4,402,056 | 8/1983 | Sado et al. | 364/705 |
| 4,530,068 | 7/1985 | Nakanishi et al. | 364/900 |
| 4,578,811 | 3/1986 | Inagaki | 382/11 |
| 4,583,189 | 4/1986 | Koyama | 364/709.01 X |
| 4,639,720 | 1/1987 | Rympalski et al. | 340/712 |
| 4,656,317 | 4/1987 | Tsugei et al. | 382/13 X |
| 4,715,010 | 12/1987 | Inoue et al. | 364/705.06 |
| 4,740,913 | 4/1988 | Washizuka et al. | 364/900 |
| 4,752,773 | 6/1988 | Togawa et al. | 340/721 |

FOREIGN PATENT DOCUMENTS 2145547 3/1985 United Kingdom ........... 364/709.11

Primary Examiner—Dale M. Shaw
Assistant Examiner—Michael A. Jaffe
Attorney, Agent, or Firm—Frishauf, Holtz, Goodman & Woodward

[57] ABSTRACT

A pocket size data storage apparatus with a tablet device for inputting image data, of the present invention, has a display section of a dot matrix type, and a tablet device made of transparent members and mounted on this display section as one unit. Image data is input from the tablet device and displayed on the display section. Character data input by operating the character keys can be displayed together with the image data. Image data and character data are related to each other as a pair of data and are stored.

18 Claims, 34 Drawing Sheets

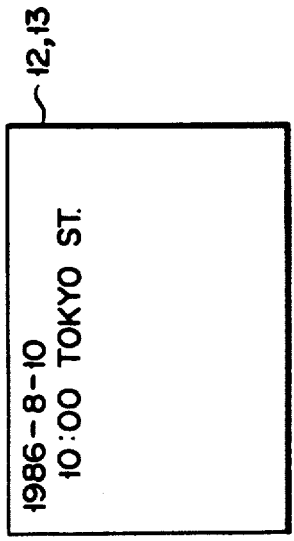
FIG. 3A
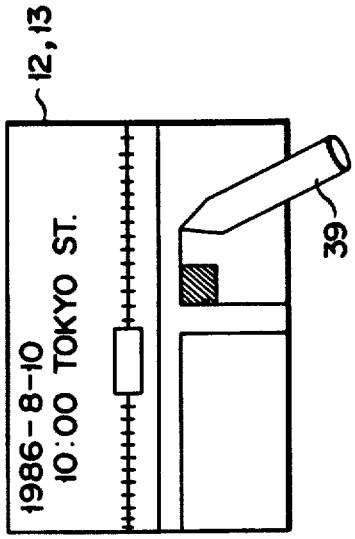
FIG. 3B IMAGE INPUT
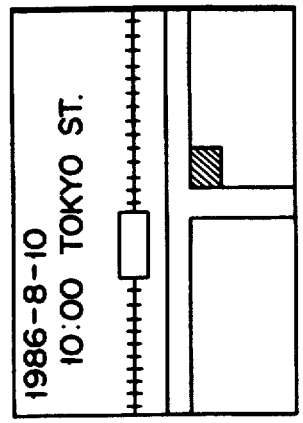
FIG. 3C

F I G. 10
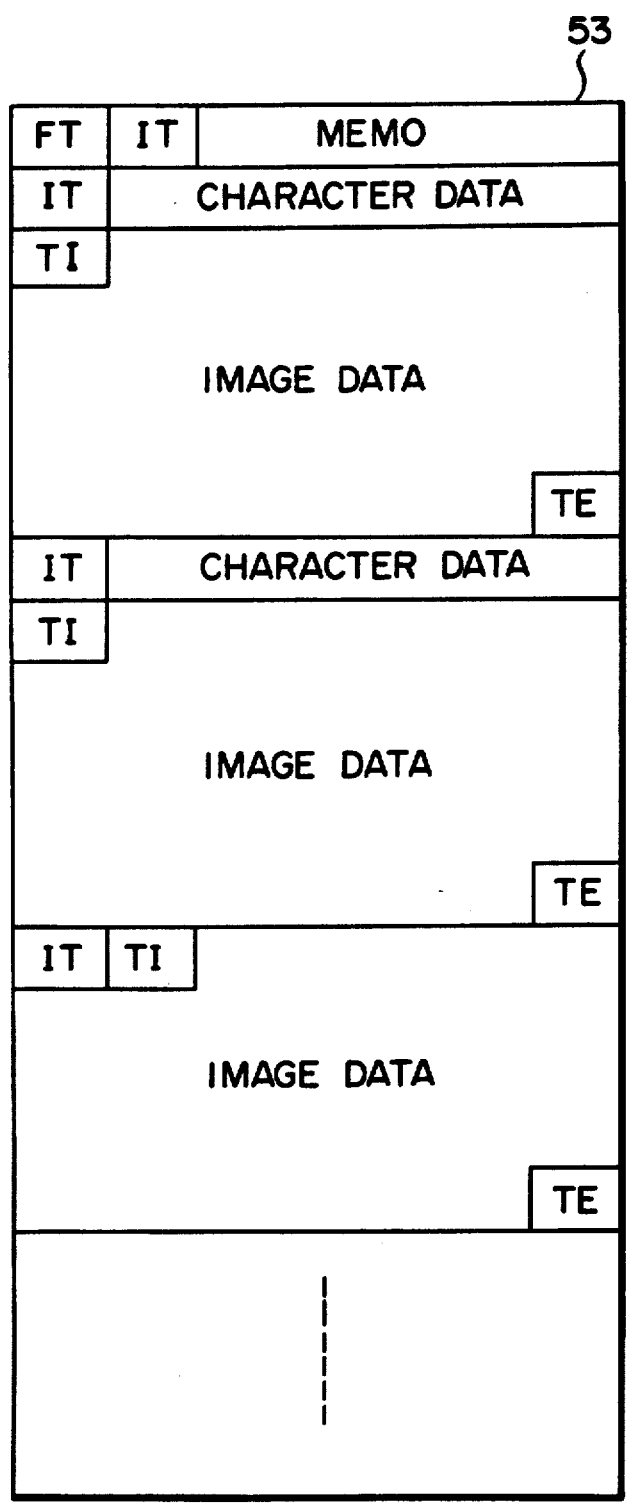

FIG. 13A
46, 54
MEMO
ETHYLENE
PROPYLENE
BUTYLENE
✗
POLYETHYLENE
BUTADIENE
POLYPROPYLENE
FIG. 13B
PROPYLENE
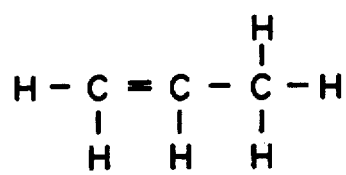
FIG. 13C
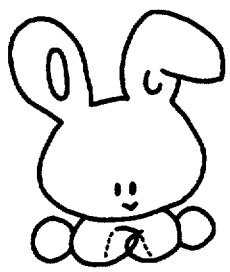

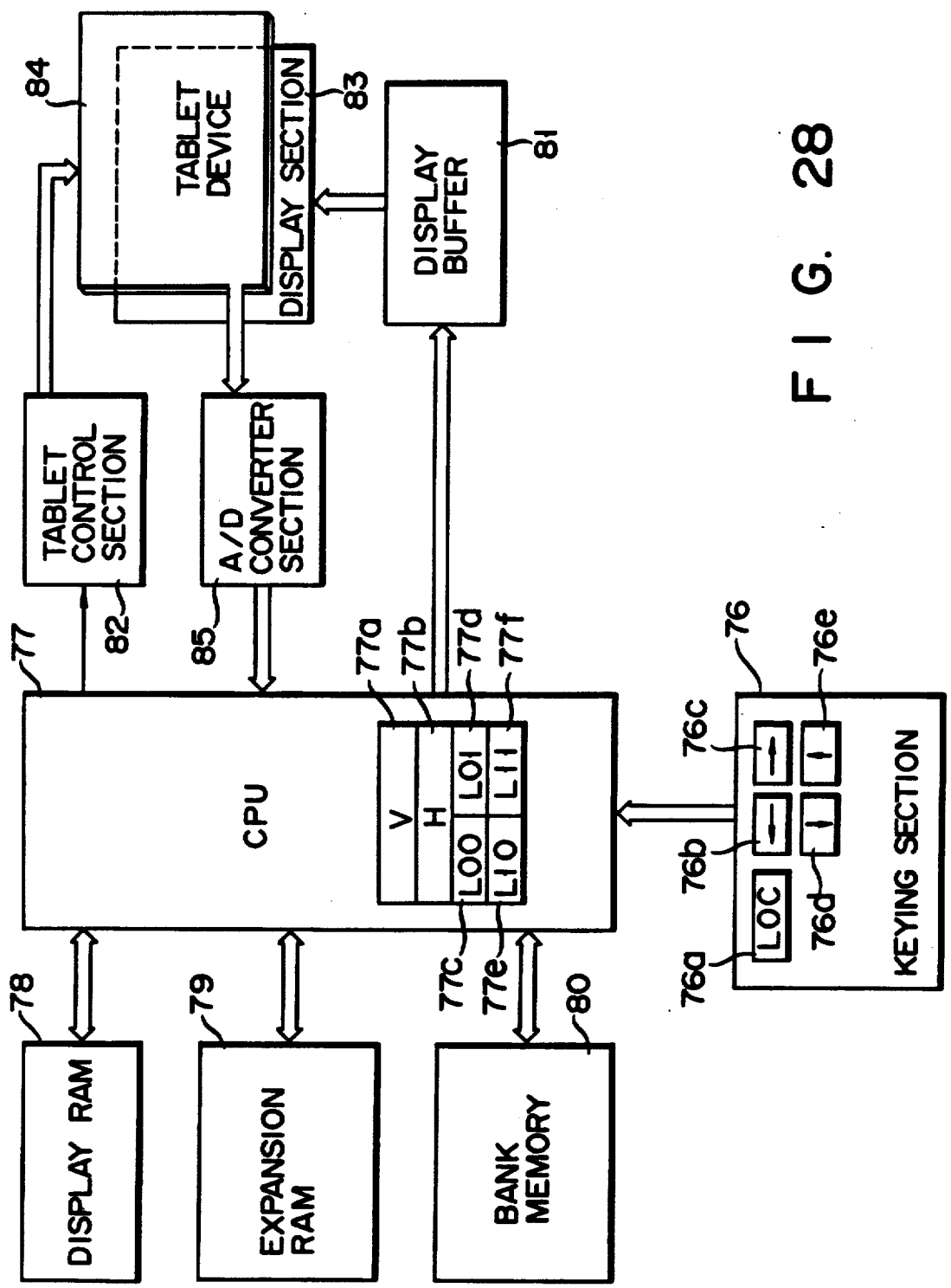
F I G. 28

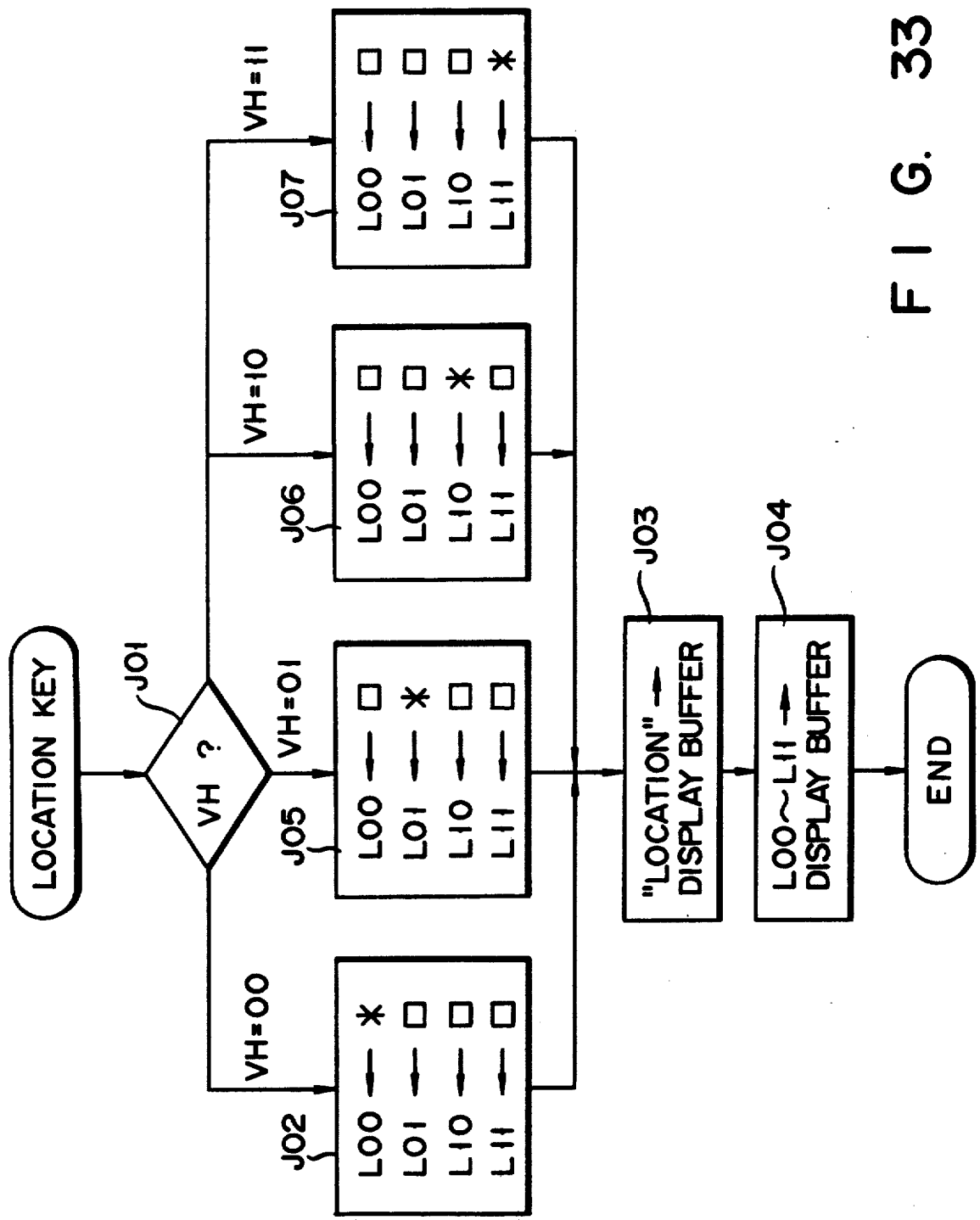

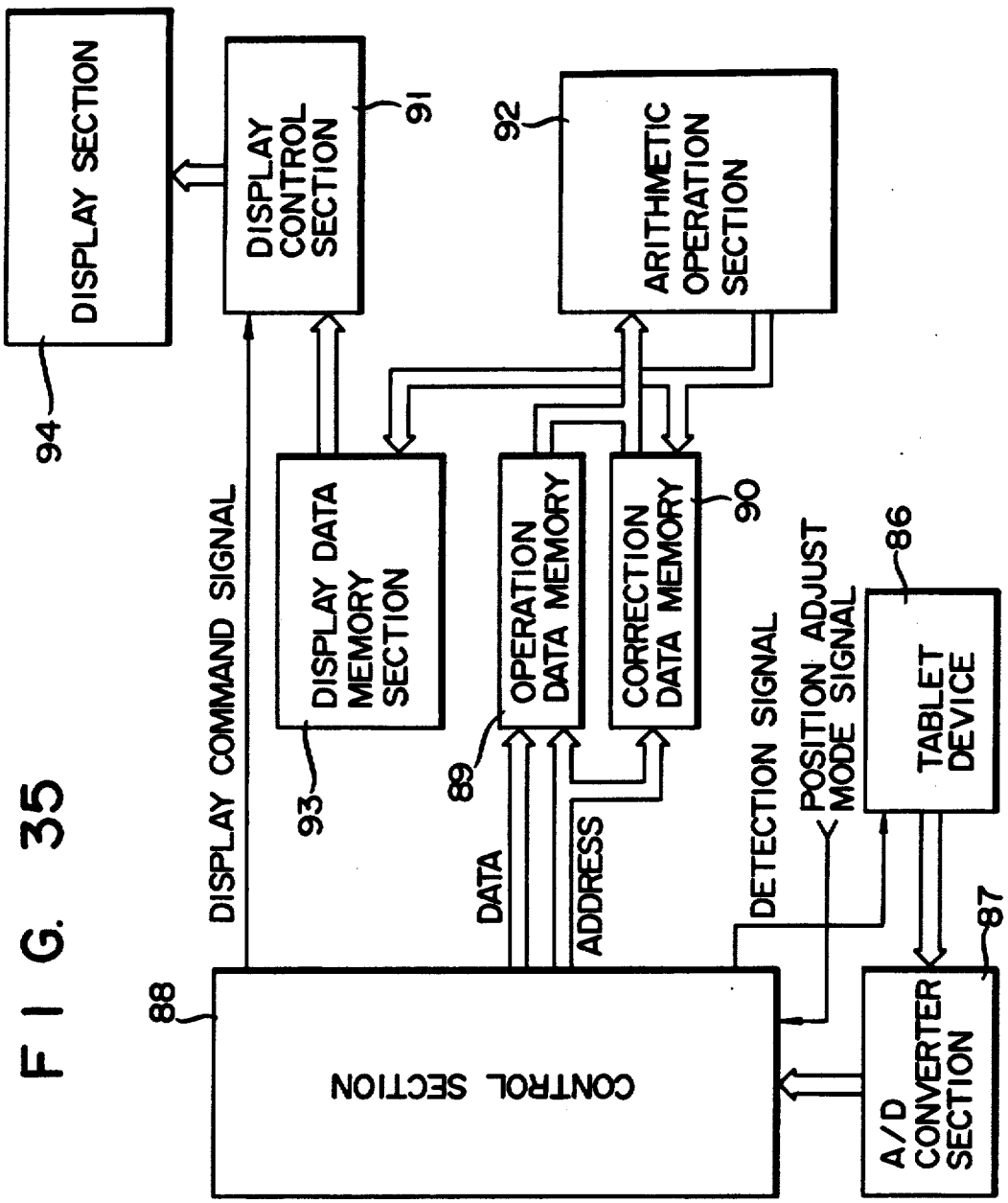
F I G. 35

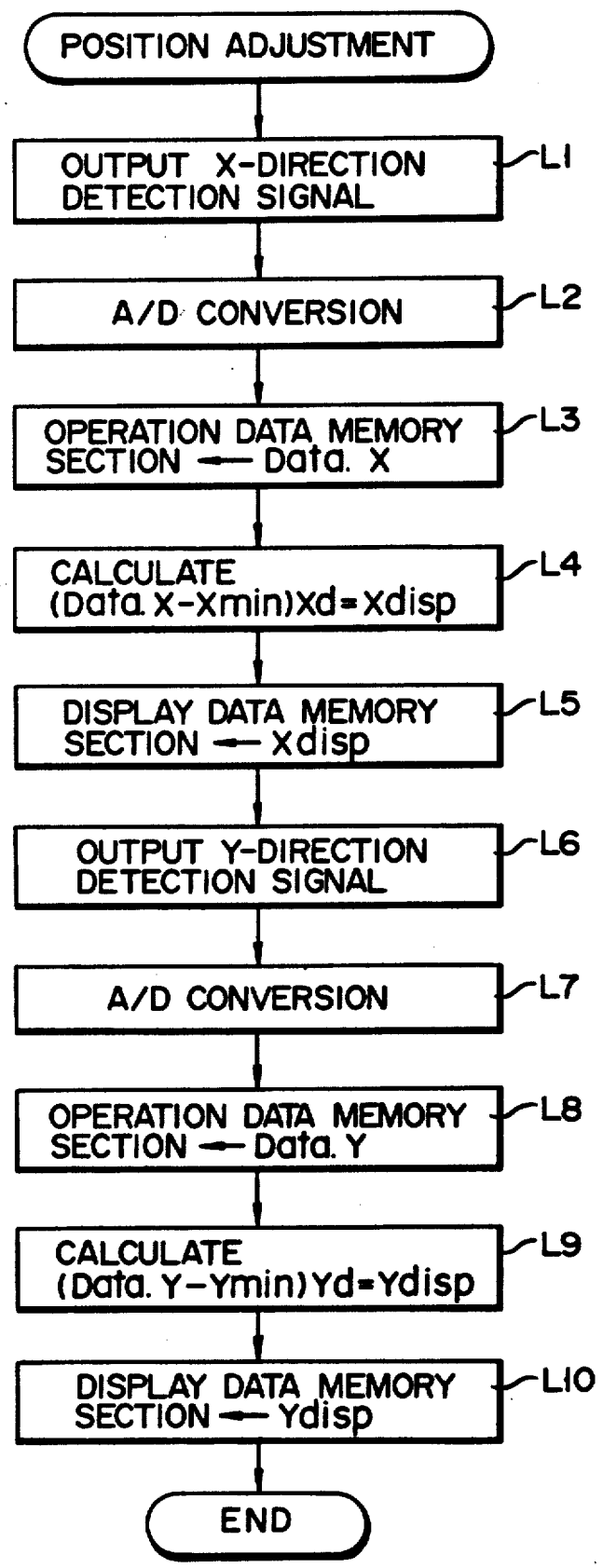

POCKET SIZE DATA STORAGE APPARATUS WITH TABLET DEVICE FOR INPUTTING IMAGE DATA

This application is a continuation of application Ser. No. 235,709, filed Aug. 19, 1988, now abandoned, which is a continuation of application Ser. No. 946,712, filed Dec. 24, 1986, now abandoned.

BACKGROUND OF THE INVENTION

This invention relates to a pocket size data storage apparatus with a tablet device for inputting image data, which is capable of storing information such as telephone numbers and schedule data including graphic data, and of displaying the information on a display section, if necessary.

There have been known pocket size data storage apparatuses, by which information such as telephone numbers, schedule data and memo data are separately stored based on each item, and if necessary, desired data is visualized on a display section. A typical example is U.S. Pat. No. 4,117,542. In such electronic notebook apparatuses, a keyboard including alphabet keys and numerical keys is provided. For data entry, such keys are operated.

The conventional electronic notebook apparatus can store only a limited number of characters, but cannot store image data such as maps and drawings.

SUMMARY OF THE INVENTION

Accordingly, an object of this invention is to provide a pocket size data storage apparatus, with a tablet device, which can store and display image data as well as character data.

Another object of this invention is to provide a pocket size data storage apparatus, having a tablet device, which can store character data and image data in a paired manner, and can easily search the desired image data using the character data as an index.

A further object of this invention is to provide a pocket size data storage apparatus which can easily write and erase image data, in order to improve the efficiency of data entry.

An additional object of this invention is to provide a pocket size data storage apparatus with a tablet device which allows thickness of write lines or erase lines to be variable in writing or erasing image data, thereby increasing the variations of data entries.

Another object of this invention is to provide a pocket size data storage apparatus, with a tablet device, which can specify a portion of displayed image data to be erased by the same operation as that of entering image data, and collectively erase the image data within the specified portion.

An object of this invention is to provide a pocket size data storage apparatus, with a tablet device, which can store image data having larger capacity than that of a display screen.

Still another object of this invention is to provide a pocket size data storage apparatus, with a tablet device, which can simply perform calibration between a position on a screen and a position on the tablet arranged on the screen, thereby reproducing the position on the screen with respect to the position on the tablet.

In a pocket size data storage apparatus with a tablet device for inputting image data, according to this invention, the tablet device made of a transparent member is arranged on a display screen in a unit manner. The image data entered by the writing operation on the tablet device is stored into a memory, as well as character data entered from a keyboard. These data can be read out from the memory and displayed on the display screen. Therefore, in addition to character data, image data can be stored and displayed.

In a pocket size data storage apparatus with a tablet device, according to this invention, image data combined with character data is stored. Each character group of the stored character data are displayed, the group consisting of a predetermined number of characters, for example, characters for one line on the display screen, and serving an index. The image data is read out by specifying a desired character group corresponding thereto. Therefore, desired image data can easily be searched from the stored image data.

A pocket size data storage apparatus with a tablet device according to this invention can enter image data with a variety of functions, and thereby can improve the efficiency of the data entering.

A pocket size data storage apparatus with a tablet device according to this invention can easily display and erase line data of image data with different thicknesses, thus improving the data entering efficiency.

Additionally, a part of displayed image data can be erased by entering erasure image data from a tablet device so as to enclose the portions to be erased of the displayed image data. This feature remarkably simplifies an image data erasure operation.

Furthermore, a large amount image data for a plurality of screens can be stored in an interrelated manner. Therefore, there is provided a pocket size data storage apparatus in which the image data for one screen at the designated screen location can be displayed.

A pocket size data storage apparatus according to this invention can exactly detect location data on a display screen corresponding to input location data on a tablet device without any complicated adjustment, and, therefore, can reliably display data input to a tablet device on the display screen.

To achieve the above objects, there is provided a pocket size data storage apparatus with a tablet device, comprising:

display means for displaying display data in the form of a dot matrix;

image data input means for inputting image data by a pressing operation, the image data input means including the tablet device composed of transparent members and mounted on the display means as one unit;

character data input means, having character keys, for inputting character data;

display data memory means for storing display data to be displayed on the display means, the display data memory means having a memory area corresponding to the dot matrix of the display means;

control means for storing, in the display data memory means, the display data corresponding to the image data from the image data input means, and also the the display data corresponding to character data from the character data input means; and memory means for storing image data from the image data input means, and character data from the character data input means as a pair of data.

BRIEF DESCRIPTION OF THE DRAWINGS

FIGS. 3A to 3C illustrate diagrams for explaining data entry operations and displays associated therewith on a display section in the first embodiment;

FIG. 10 shows a memory map in a data RAM;

FIGS. 13A to 13C show diagrams illustrating character data and image data input to an image input tablet in the second embodiment, respectively;

FIG. 28 is a block diagram of a pocket size data storage apparatus, with a tablet device for inputting image data, according to a fifth embodiment of this invention;

FIG. 33 shows a flowchart for explaining processing when location keys are operated, in the fifth embodiment;

FIG. 35 is a block diagram of a pocket size data storage apparatus, with a tablet device for inputting image data, according to a sixth embodiment of this invention; and FIGS. 36 and 37 show flowcharts for explaining the operation of the sixth embodiment.

DETAILED DESCRIPTION OF THE PREFERRED EMBODIMENT

A pocket size data storage apparatus with a tablet device for inputting image data according to this invention will be described with reference to the accompanying drawings. This apparatus is also constructed to have an electronic calculator function.

First, a first embodiment of the apparatus according to the present invention, with reference to FIGS. 1 to 6B, will be described.

Figure 1:
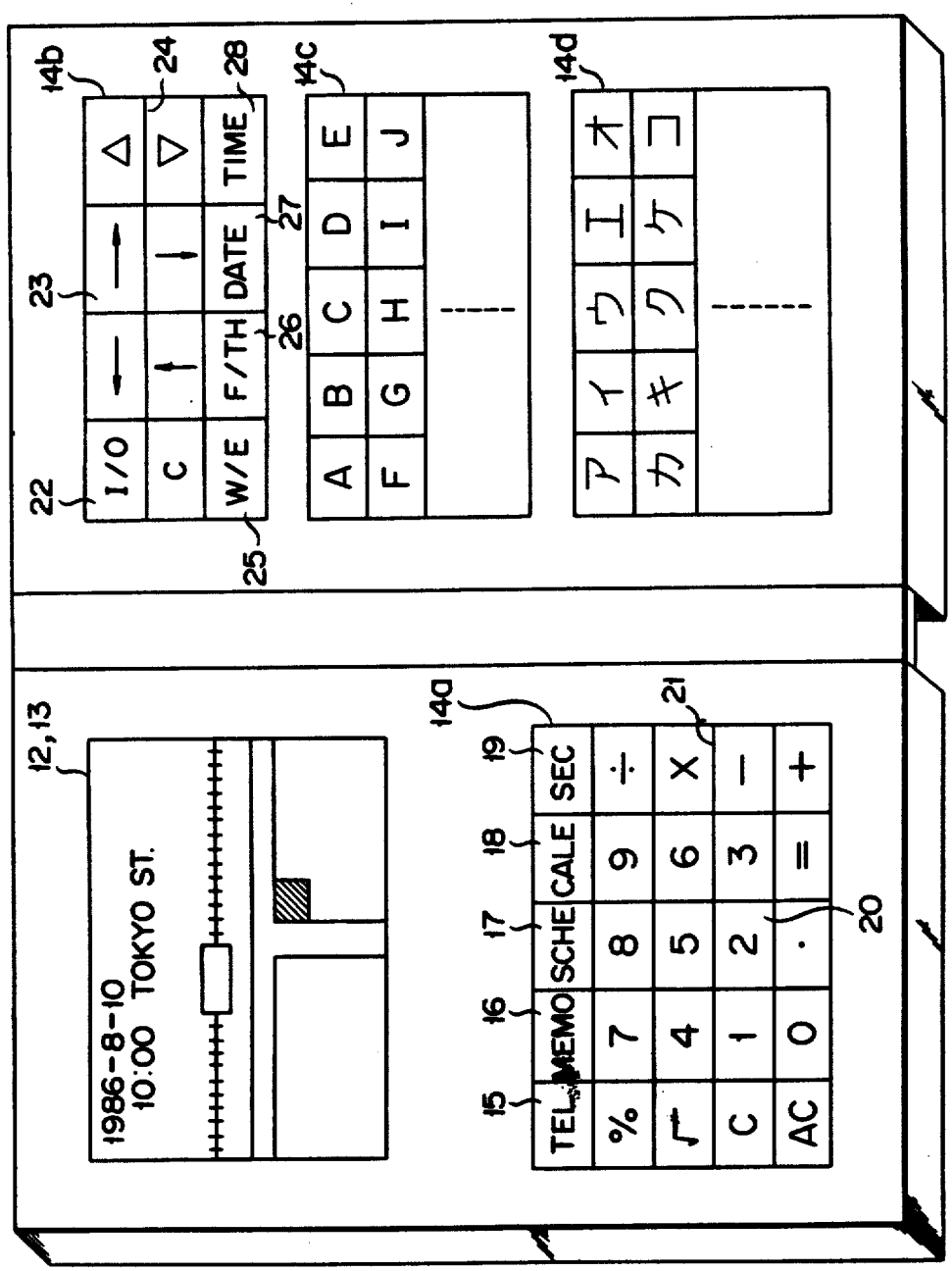
FIG. 1 shows an external view of a pocket size data storage apparatus, with a tablet device for inputting image data, of this invention.

In FIG. 1, an external structure of the apparatus according to the invention is shown, and reference numeral 11 designates a notebook style main case. This notebook style main case generally is folded in half for carrying. In the open position shown in FIG. 1, display section 13 with tablet device 12 mounted thereon is provided on the left side of the inner surface. Immediately below that is first key group 14a. Second through fourth key groups 14b to 14d are located on the right side. These first to fourth key groups 14a to 14d make up keying section 14. First key group 14a is composed of keys for designating modes, inputting numerals and giving instructions for calculation. More specifically, it is composed of keys 15 through 21. Key 15 is used to designate a telephone number mode, key 16 a memo mode, key 17 a schedule mode, key 18 a calendar mode, and key 19 a secret mode. Keys 20 are for numeral entry, and keys 21 are operation or function keys. Second key group 14b is composed of keys 22 through 28, for performing control for data input and output. I/O key 22 is used to set an input/output state for each mode. Cursor key 23 is to move a cursor displayed on display section 13 in an up-, down-, left-, or right-direction. Scroll key 24 is to select the displayed data. W/E key 25 is to designate either write or erase operation in a tablet input mode. F/TH key 26 is to designate thickness of a line in the tablet input mode. DATE key 27 and TIME key 28 are used to designate date and time, respectively, in a schedule mode. Third key group 14c is composed of alphabet keys, and fourth key group 14d of Kana (Japanese phonetic character) keys.

A configuration of electronic circuits contained in the first embodiment will be described referring to FIG. 2.

Figure 2:
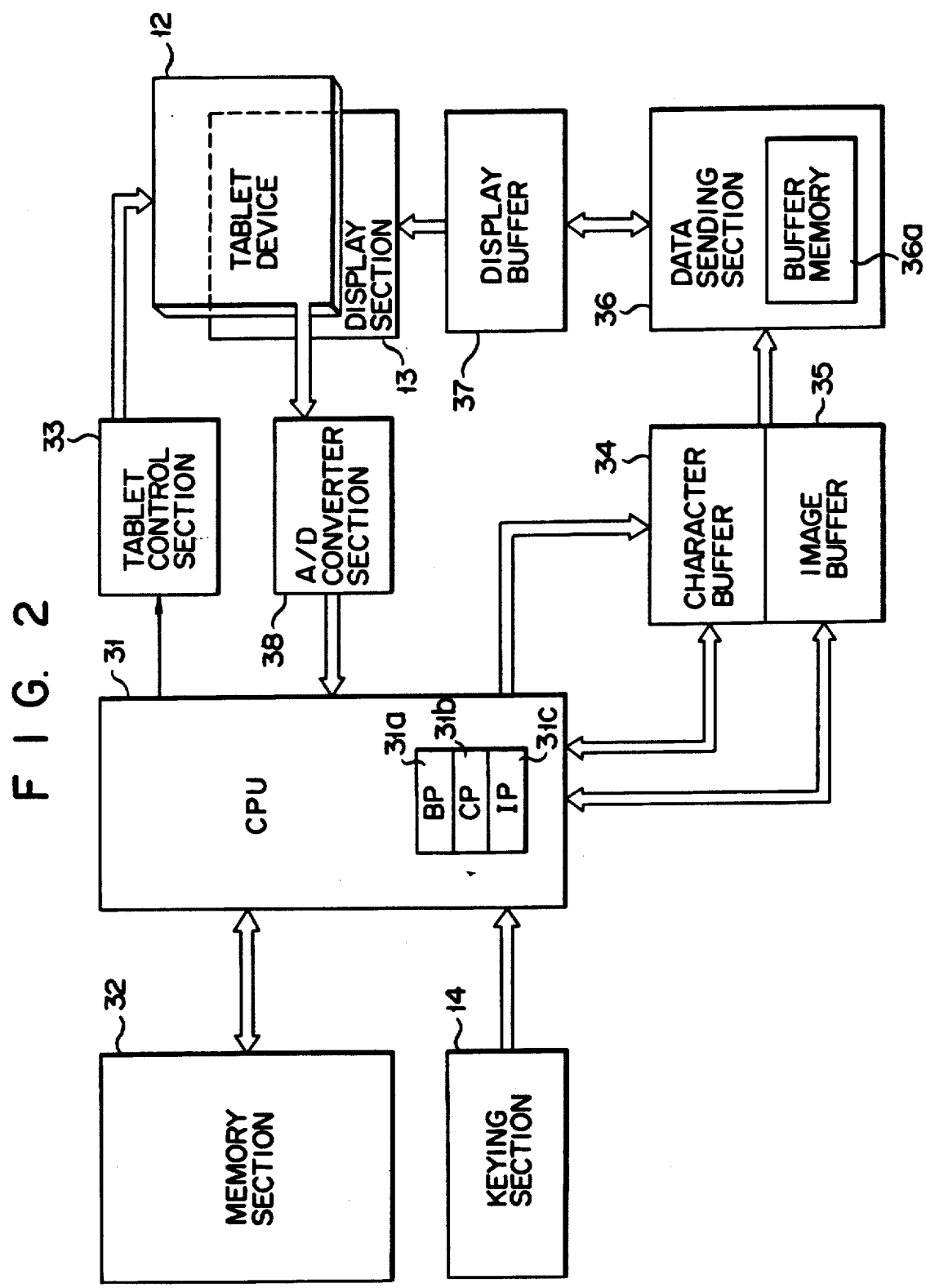
FIG. 2 shows a block diagram of the apparatus according to a first embodiment of this invention.

In FIG. 2, a key operation signal produced when keying section 14 is operated, is sent to CPU 31. CPU 31 controls the overall sections. CPU 31 contains bank pointer BP 31a, character pointer CP 31b, and image pointer IP 31c. BP 31a is provided for pointing control or address control of memory section 32. CP 31b is for pointing control of character buffer 34. IP 31c is for pointing control of image buffer 35. These pointing controls will be described later in detail. CPU 31 performs write operations into and read-out operations from memory section 32, and sends control signals to tablet control section 33. CPU 31 also performs exchange of character data with character buffer 34, and exchange of image data with image buffer 35, and also sends out control data to character buffer 34 and image buffer 35 to read out from buffers 34 and 35.

Character buffer 34 stores character data to be displayed on display section 13. Character buffer 34 has a memory capacity of 128 characters, each represented by 8-bit data. The character data stored in buffer 34 is transferred to data sending section 36 in 8-bit units, in accordance with the control data from CPU 31.

Image buffer 35 operates in almost the same manner as described above. Buffer 35 can store displayed image data up to 96×64 bits. The image data stored in buffer 35 is transferred to data sending section 36 in 8-bit units, in accordance with the control data from CPU 31. Data sending section 36 includes internal buffer memory 36a. Section 36 temporarily stores logical operation results of character data from character buffer 34 and image data from image buffer 35. Then, section 36 transfers the results to display buffer 37. Then, display section 13 is driven according to the data held in display buffer 37, so that the character data and image data are displayed. This display section 13 is composed of, for example, liquid crystal display elements arrayed in a matrix of 96 dots (row)×64 dots (column). Each character is displayed in 6×8 dots. Therefore, 8-line character data of 16 characters for each line can be displayed.

Tablet device section 12 is arranged on display section 13 as one unit, and is composed of two transparent electrode plates with spacers therebetween. Control bias from tablet control section 33 is applied to section 12 in accordance with a control signal of CPU 31. When writing pressure is applied to tablet input section 12, X-coordinate data and Y-coordinate data, of section 12, at a pressured point are sent to A/D converter section 38 as analog voltage data. Section 38 converts the input voltage data into digital data with resolution of about 384 levels in a horizontal direction, and about 256 levels in a vertical direction. Then, the digital data is supplied to CPU 31.

The operation of the first embodiment will now be described.

In a schedule mode, character data consisting of date, time, and place, and image data representing a simple map are input from tablet device section 12. These data are stored in memory section 32 by operating SCHE key 17. After this, data is read out as needed from memory section 32 to display it. This will now be used as an example to explain the operation.

First, an input state is selected by I/O key 22. Then, as shown in FIG. 3, the date "Aug. 10, 1986" is input as "1986" "8" "10", using numeral input keys 20 and partitioned with DATE key 27. To enter data corresponding to the schedule of the input date, after pushing the "→" key of cursor keys 23, time is input by entering "10" "00", using numeral entry keys 20 and partitioned with TIME key 28. Then, data "TOKYO ST." is entered with third key group 14c. Key operation signal data by these key inputs is sent to CPU 31. CPU 31 checks the input data, adds end code data to their last position, and loads the added data into character buffer 34. This character data is sent to buffer memory 36a of data sending section 36. It is stored there, and also output to display buffer 37. Then, as shown in FIG. 3A, the data input by keying section 14 is displayed.

A simple map is drawn on tablet device section 12 arranged on display section 13 as one unit, using special pen 39, as shown in FIG. 3B. Section 12 sends X-coordinate data and Y-coordinate data thereof at the pressured point to A/D converter section 38 in the form of analog voltage values. A/D converter section 38 converts these values into digital image data, and sends it to CPU 31. CPU 31 processes this data as image data to be displayed on display section 13 and sends the processed data to image buffer 35. Then, this image data is sent to buffer memory 36a of data sending section 36 and is stored therein. The image data is also sent to display buffer 37. As a result, data with respect to image drawn on section 12, as shown in FIG. 3B, is displayed in real time on display section 13.

As shown in FIG. 3C, SCHE key 17 is operated, so that the entered character and image data are stored as schedule data. At this time, CPU 31 performs processing shown in FIGS. 4A and 4B, in response to operation of SCHE key 17, and the processed schedule data is stored in memory section 32, as shown in FIG. 5.

Figure 4A:
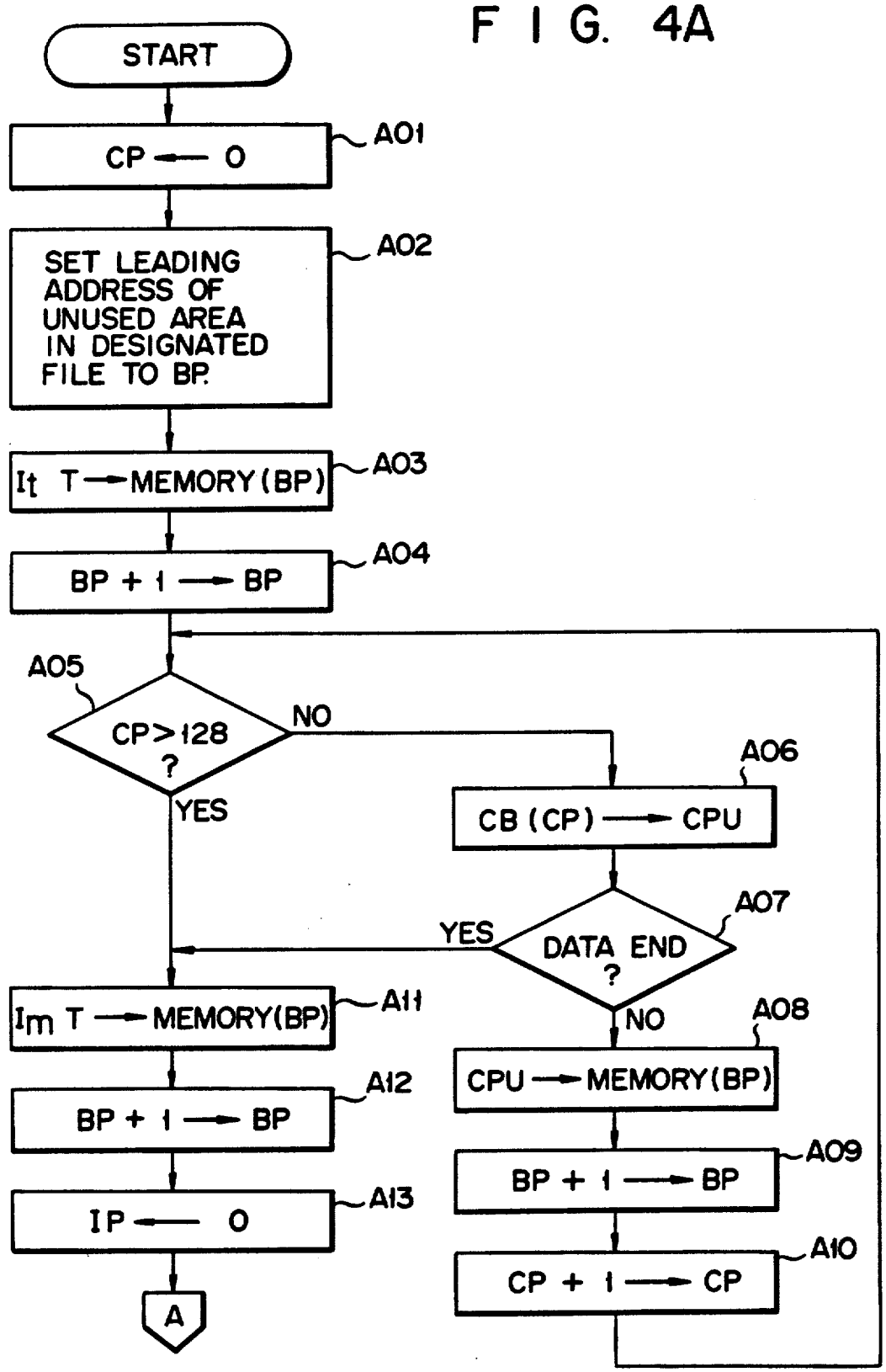
FIGS. 4A and 4B show a successive flowchart for explaining a sequence of data entry processing in the first embodiment.
Figure 4B:
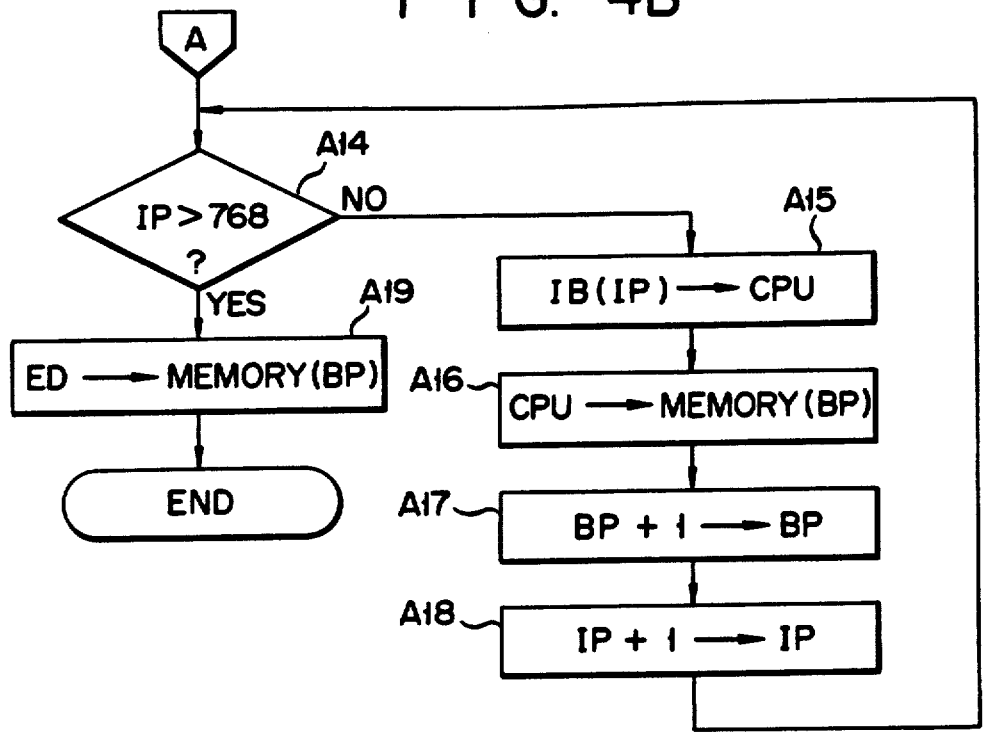
Figure 5:
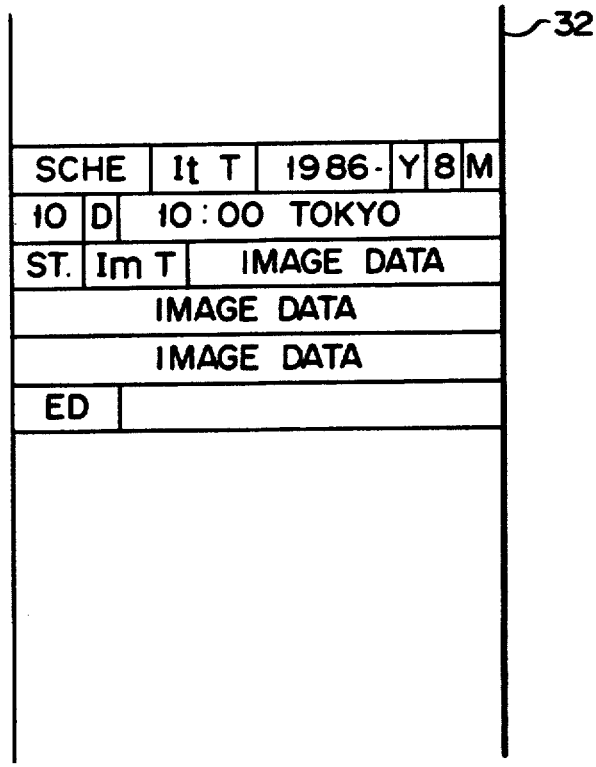
FIG. 5 shows a memory map of a memory section in the first embodiment.

In step A01 of FIG. 4A, character pointer CP 31b is cleared and set to "0". In step A02, a content of bank pointer BP 31a is set into a leading position in an unused area of a designated file, or a schedule file in this example, in memory section 32. Assuming that no schedule data has been stored into the schedule file of memory section 32, input schedule data will be sequentially stored from an address immediately succeeding an address for a SCHE code indicating a leading position of the schedule file. In step A03, the "ItT" code indicating a leading position of the schedule data, is written in memory section 32 at the designated address by BP 31a. After the content of BP 31a has been incremented by "1" in step A04, step A05 is executed. In step A05, it is checked whether or not the content of CP 31b exceeds maximum value "128". Since the content here is still "0", the answer is NO, and step A06 is executed next. In step A06, since the content of CP 31b is "0", CPU 31 reads out leading character data "1" in "1986" from the "0" address of character buffer (CB) 34. In the next step, A07, it is checked whether or not this read-out character data is the end code added to the schedule data stored in character buffer 34. Then, based on the checked result, it is determined whether or not the readout of character data has been completed. In this case, the answer is NO. Therefore, in step A08, the character data "1" read out by CPU 31, is written into the address location, designated by BP 31a, of the schedule file of memory section 32. In step A09, BP 31a is incremented by "1". In the next step, A10, CP 31b is also incremented by "1", and then the flow returns to step A05.

By repeating the processing in steps A05 to A10, the character data stored in character buffer 34 is loaded into memory section 32. Whether all the character data in buffer 34 have been stored in memory section 32, is determined in step A07. Then, the flow moves to step A11, so that write operation of image data to memory section 32 can be performed.

In step A11, the code "ImT" indicating a leading position of the image data, is written into an address, designated by BP 31a, of memory section 32. In step A12, the content of BP 31A is incremented by "1", and then, the flow proceeds to step A13. Here, IP 31c is cleared (set to "0"), and then, the flow proceeds to step A14 of FIG. 4B. In step A14, it is checked whether or not the content in IP 31c exceeds its maximum value of 768. Here, the content is still "0", so the answer is NO, and the flow proceeds to step A15. In step A15, since the content of IP 31c is still "0", CPU 31 reads out the first eight bits of image data from the "0" address of image buffer (IB) 35. In step A16, the image data read out by CPU 31 is written into an address location, designated by BP 31a, of the schedule file of memory section 32. In step A17, BP 31a is incremented by "1". In step A18, IP 31c is incremented by "1", then the flow returns to step A14.

By repeating the processing in steps A14 to A18, all the image data stored in IB 35 is loaded into memory section 32. When it is determined in step A14 that the content of IP 31c reaches "769", the flow proceeds to step A19. In step A19, an end code (ED in FIG. 5), for indicating a last position of the schedule data, is loaded into an address location, designated by BP 31a, of memory section 32. Storage operation of the schedule data is now completed.

At this time, the following codes and data, as shown in FIG. 5, are successively stored in the schedule file of memory section 32: schedule file leading code "SCHE", schedule data leading code "ItT", year data "1986", year data partition code "Y", month data "8", month data partition code "M", day data "8", day data partition code "D", the character data of the schedule data "10:00 TOKYO ST.", code "ImT" indicating a last location of character data and a leading location, and 8×768 dots image data and end code "ED".

Next, display operation of the schedule data stored in memory section 32, on display section 13 will be explained.

Figure 6A:
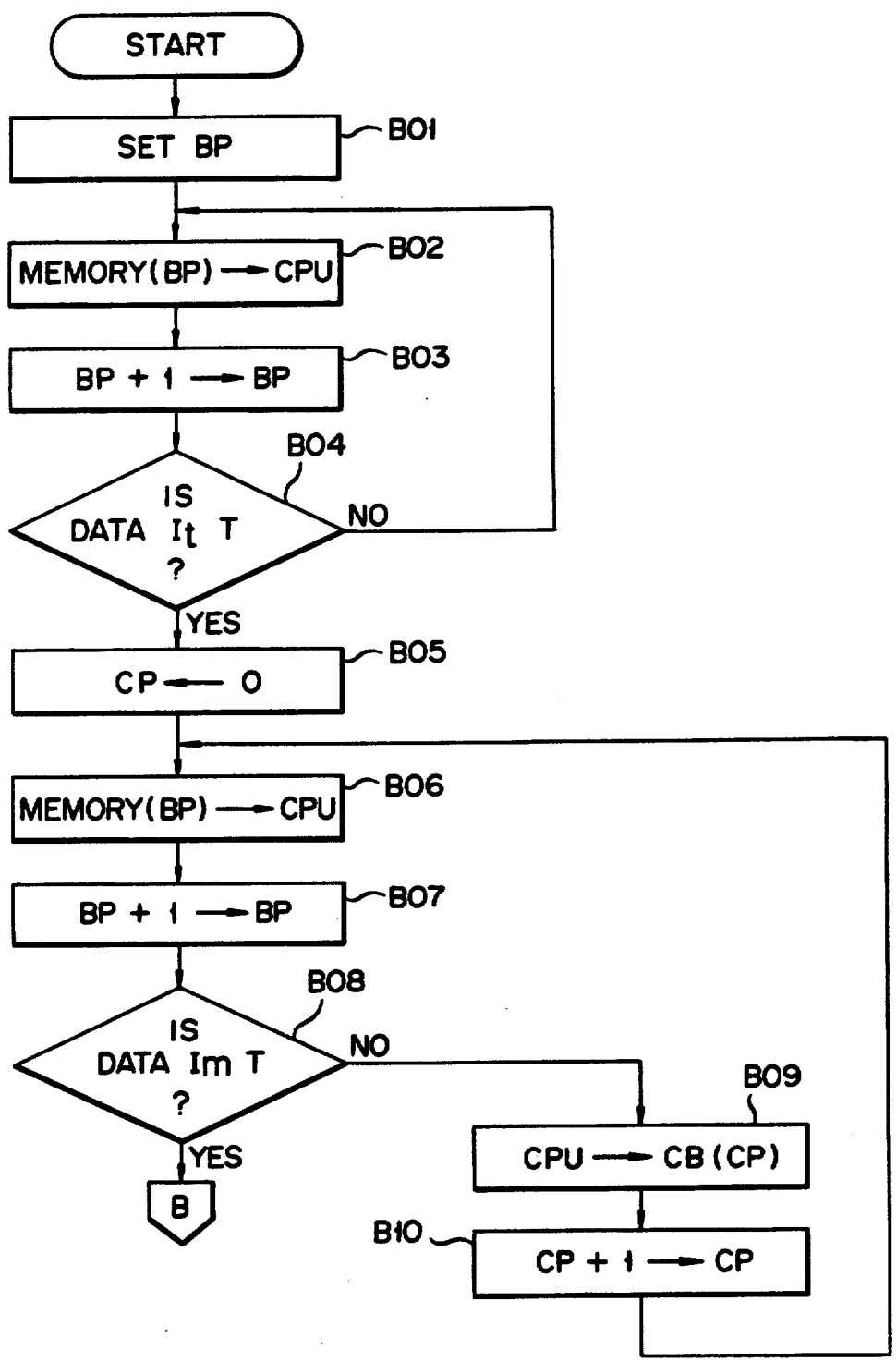
FIGS. 6A and 6B show a successive flowchart for explaining data outputting processing sequence in the first embodiment.
Figure 6B:
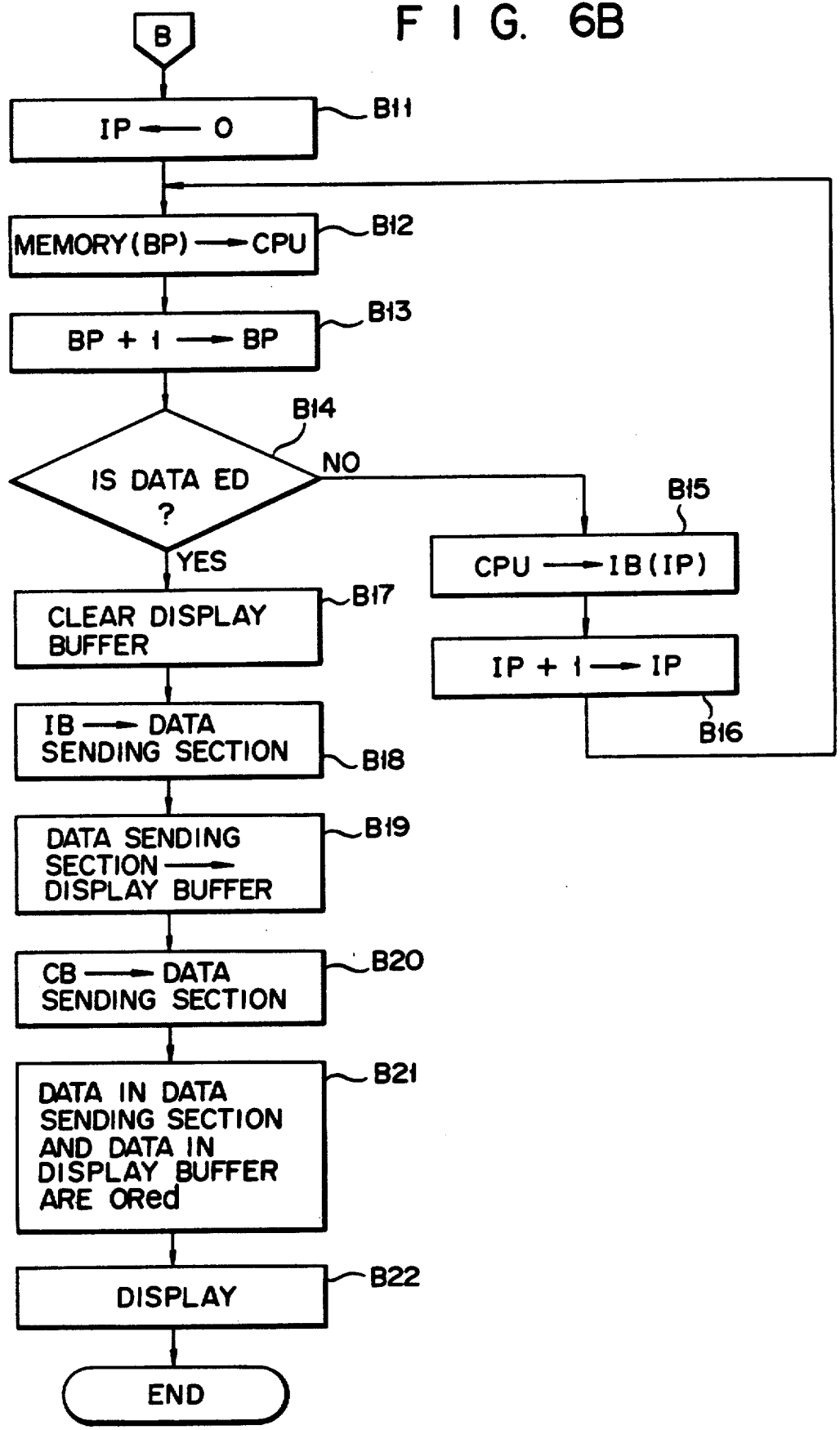

First, a data output state is set by I/O key 22. When "SCHE" key 17 is operated, processes shown in FIGS. 6A and 6B are performed. In the processing, the schedule data stored in memory section 32 is read out and displayed on display section 13. This processing will be described below.

In step B01 of FIG. 6A, a content of BP 31a is set to an address location immediately succeeding the leading code "SCHE" of the schedule file. In step B02, CPU 31 reads out data from memory section 32 in accordance with the content of BP 31a. In step B03, the content of BP 31a is incremented by "1". In step B04, it is checked whether or not the data read out in step B02 is code "ItT". In this case, the data is code "ItT". Therefore, the answer is YES, and the flow proceeds to step B05. In a case where this answer is NO, the flow would return to step B02. Then steps B02 to B04 would be repeated until the read-out data in step B04 is determined to be code "ItT". In step B05, CP 31b is cleared and set to "0". In step B06, CPU 31 reads out the leading character data "1" of "1986" from memory section 32 in accordance with the content of BP 31a. In step B07, BP is incremented by "1". In step B08, when it is determined that the read-out character data "1" is not code "ImT", the flow proceeds to step B09. In step B09, character data "1" is transferred to the address location "0", designated by character pointer 31b, of character buffer (CB) 34. In step B10, the content of CP 31b is incremented by "1", and the flow returns to step B06.

By repeating the processing in steps B06 to B10, all the character data stored in memory section 32 is sequentially transferred to character buffer 34. After all the character data stored in memory section 32 is transferred to character buffer 34 and the code "ImT" indicating the leading position of the image data is detected in step B08, the flow proceeds to step B11 of FIG. 6B.

In step B11, IP 31c is cleared and set to "0". In step B12, CPU 31 reads out the first image data from memory section 32 in accordance with the content of BP 31a. In step B13, BP 31a is incremented by "1". In step B14, it is determined whether or not the image data read out is code "ED". In step B15, this read-out image data is transferred to an address location "0", designated by IP 31c, of image buffer 35 when the read-out image data is determined to not be the code "ED". In step B16, the content of IP 31c is incremented by "1", and the flow returns to step B12.

By repeating the processing of steps B12 to B16, all the image data stored in memory section 32 is sequentially transferred to image buffer 35. After all the image data has been transferred and the end code "ED" is detected in step B14, the flow proceeds to step B17.

In step B17, display buffer 37 is cleared to prepare for display of the schedule data. In step B18, the image data stored in image buffer 35 is transferred to buffer memory 36a of data sending section 36. In step B19, the image data in buffer memory 36a is also transferred to display buffer 37. In step B20, the character data stored in character buffer 34 is transferred to buffer memory 36a of data sending section 36. In step B21, the character data in buffer memory 36a is sent to display buffer 37. At this time, the character data is superimposed, by logical OR operation, on the image data stored in display buffer 37. In final step B22, display section 13 is driven in accordance with the superimposed schedule data and the character data and image data stored in display buffer 37. The processing is now ended.

Figure 7A:
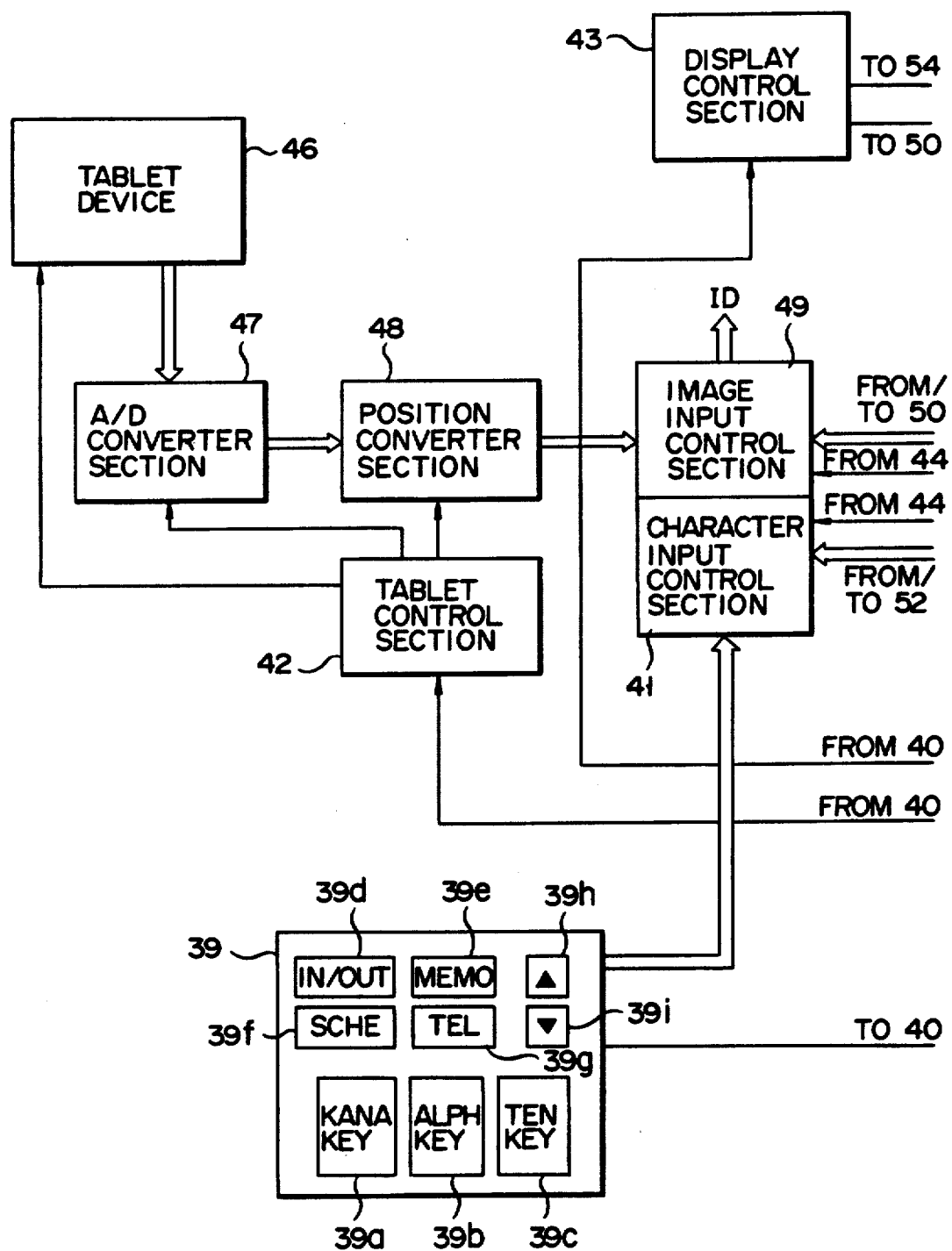
FIGS. 7A and 7B show a block diagram of a pocket size data storage apparatus, with a tablet device for inputting image data, according to a second embodiment of this invention.
Figure 7B:
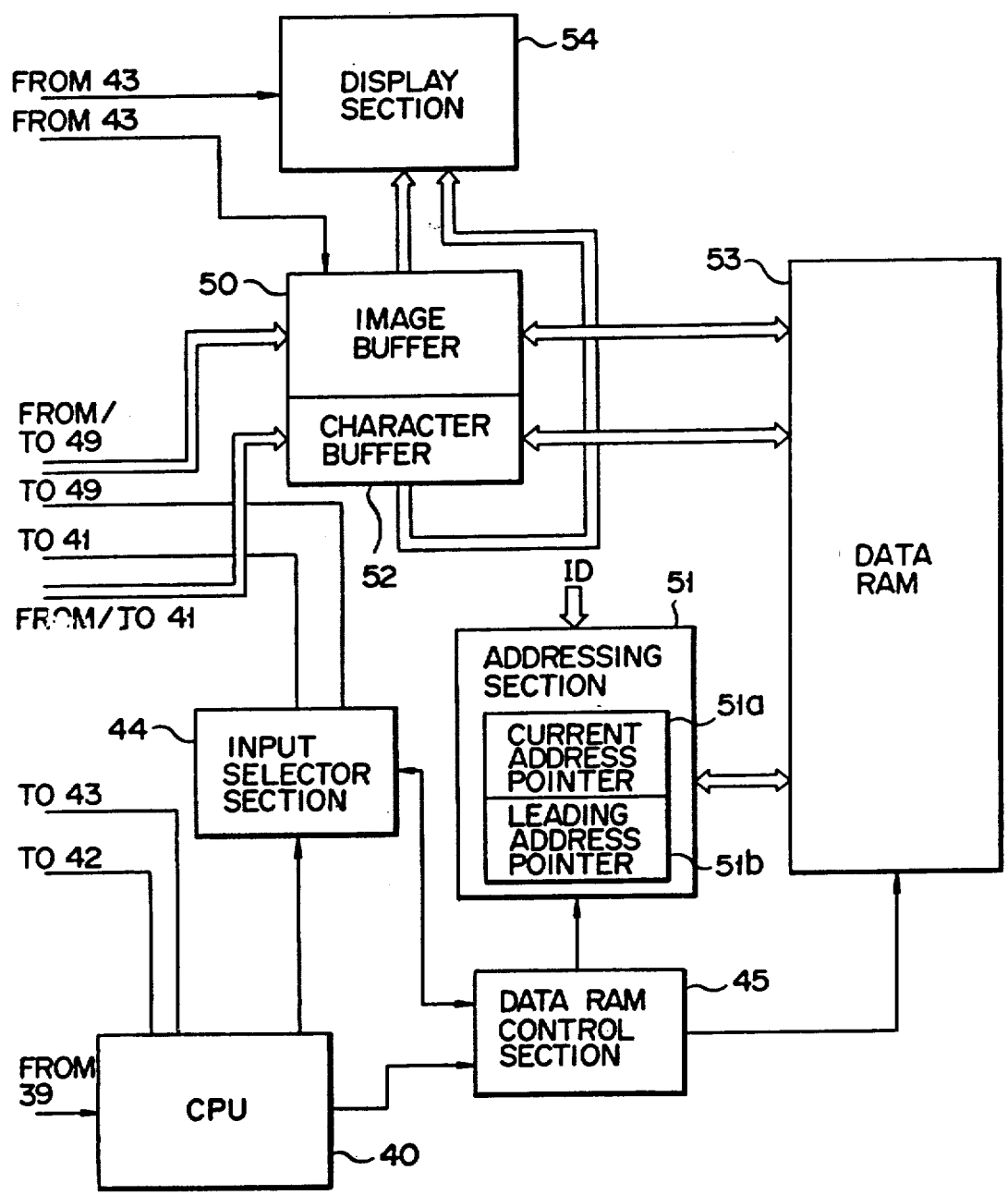

FIGS. 7A and 7B show a block diagram of the second embodiment of this invention. In FIGS. 7A and 7B, reference numeral 39 indicates a keying section. Keying section 39 is composed of keys 39a to 39i. Kana keys 39a, alphabet keys 39b, and ten keys 39c are used to enter character data. IN/OUT key 39d is used to set an input/output mode and is referred to as the I/O key hereinafter Key 39e is used to enter memo data. Key 39f is used to input schedule data. Key 39g is used to input telephone numbers. Keys 39h and 39i are used to scroll display on a screen in up and down directions. When each key of keying section 39 is operated, key operation signal data is sent to CPU 40. Especially when Kana keys 39a, alphabet keys 39b, and ten keys 39c are operated, the key operation signal data is sent to character input control section 41, as well as CPU 40.

CPU 40 performs the control of every section in accordance with signals from keying section 39. CPU 40 outputs control commands to tablet control section 42, display control section 43, input selector section 44, and data RAM control section 45. Tablet control section 42 receives commands from CPU 40, and drives tablet device 46. Section 42 also sends a timing signal to A/D converter section 47. A/D converter section 47 performs A/D conversion of voltage data corresponding to coordinates output by tablet device 46. The voltage data digitized by A/D converter section 47 are sent to position converter section 48. Position converter section 48 converts the voltage data sent from A/D converter section 47 into coordinate position data, in accordance with a command from tablet control section 42. Then, section 48 supplies the coordinate position data to image input control section 49. Image input control section 49 and character input control section 41 both operate in accordance with a selector signal from input selector section 44, which is controlled in accordance with a command from CPU 40. Image input control section 49 exchanges image data with image buffer 50, and outputs index data, shown as ID in FIGS. 7A and 7B, to addressing section 51. In the same manner, character input control section 41 exchanges character data with character buffer 52. Data RAM control section 45 controls write or read operation of image data, character data, or the like in data RAM 53, in accordance with control commands from CPU 40. Section 45 outputs commands to addressing section 51 and exchanges control command with input selector section 44. Addressing section 51 includes current address pointer 51a and leading address pointer 51b and designates address upon the read or write operation of data in data RAM 53. Data RAM 53 receives control command from data RAM control section 45 and addresses from addressing section 51. In accordance with the received command and address, data RAM 53 exchanges image and character data with image buffer 50 and character buffer 52. Data read out to image buffer 50 is sent to display section 54 in accordance with a control command from display control section 43. Also, data read out to buffer 52 is sent to display section 54 in the same manner. Display section 54 is composed of, for example, a liquid crystal display element. Data sent from image buffer 50 or character buffer 52 are displayed by display section 54 in accordance with a display command from display control section 43.

Figure 8:
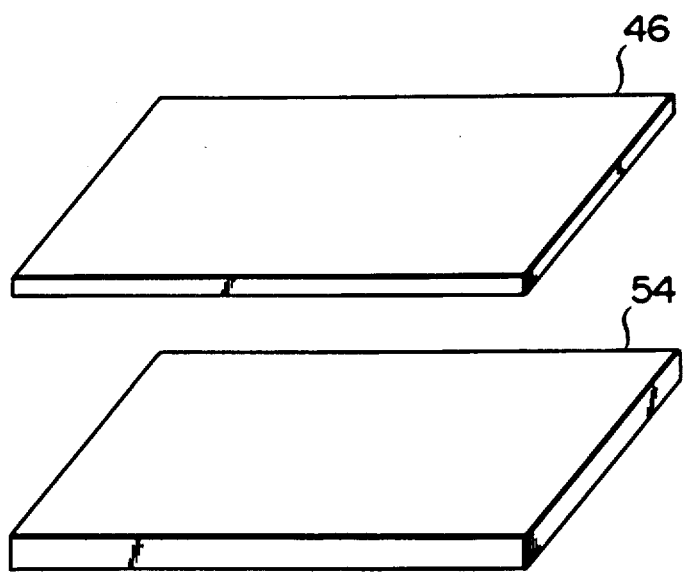
FIG. 8 shows a perspective view illustrating a configuration of a display section and the tablet device of the apparatus in the second embodiment.
Figure 9:
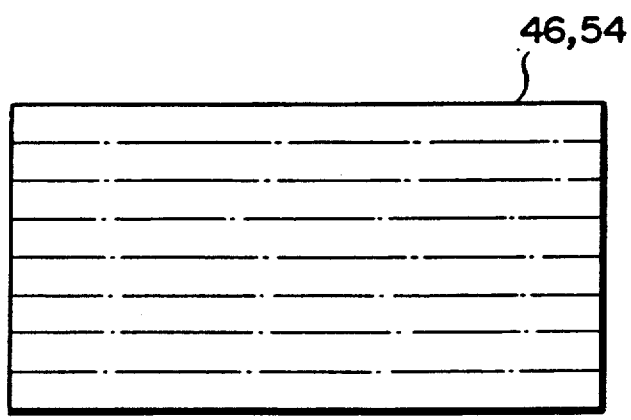
FIG. 9 shows a plan view illustrating segment regions of the display section and the tablet device for the index displays in the second embodiment.

FIG. 8 shows the structure of table device 46 and display section 54. As shown in FIG. 8, tablet device 46, composed of a transparent member, is mounted on display section 54 as one unit. When this display section 54 displays a plurality of indexes, for example, 8 line indexes, in units of lines, the voltage signal output from tablet device 46 is coordinate-processed so as to produce 8 designated inputs for 8 line positions, as shown in FIG. 9.

FIG. 10 shows memory format of data RAM 53. Data RAM 53 contains a plurality of file memory areas. FIG. 10 shows a configuration of a "MEMO" file, in the plurality of files, associated with "MEMO" key 39e of keying section 39. An "FT" code is located at the leading position of the "MEMO" file memory area, and an "IT" code and a file name data "MEMO" succeed the code "FT". The "IT" code and the character data for index display follows that. Further, image data succeeds the character data. A "TI" code is attached to a leading position of the image data, and a "TE" code is attached to a last position. This "IT" code, character data, and image data with the "TI" code at the leading position, and the "TE" code at the last position, make up one block of data. Each block is stored in a different position. When character data for the index display is not entered, the image data with the "TI" code at the leading position and the "TE" code at the last position will be located immediately following the "IT" code. In this case, character data will not be stored.

Next, as an operation example of the above embodiment, display of image data in a memo file will be described, with reference to FIG. 10.

Figure 11:
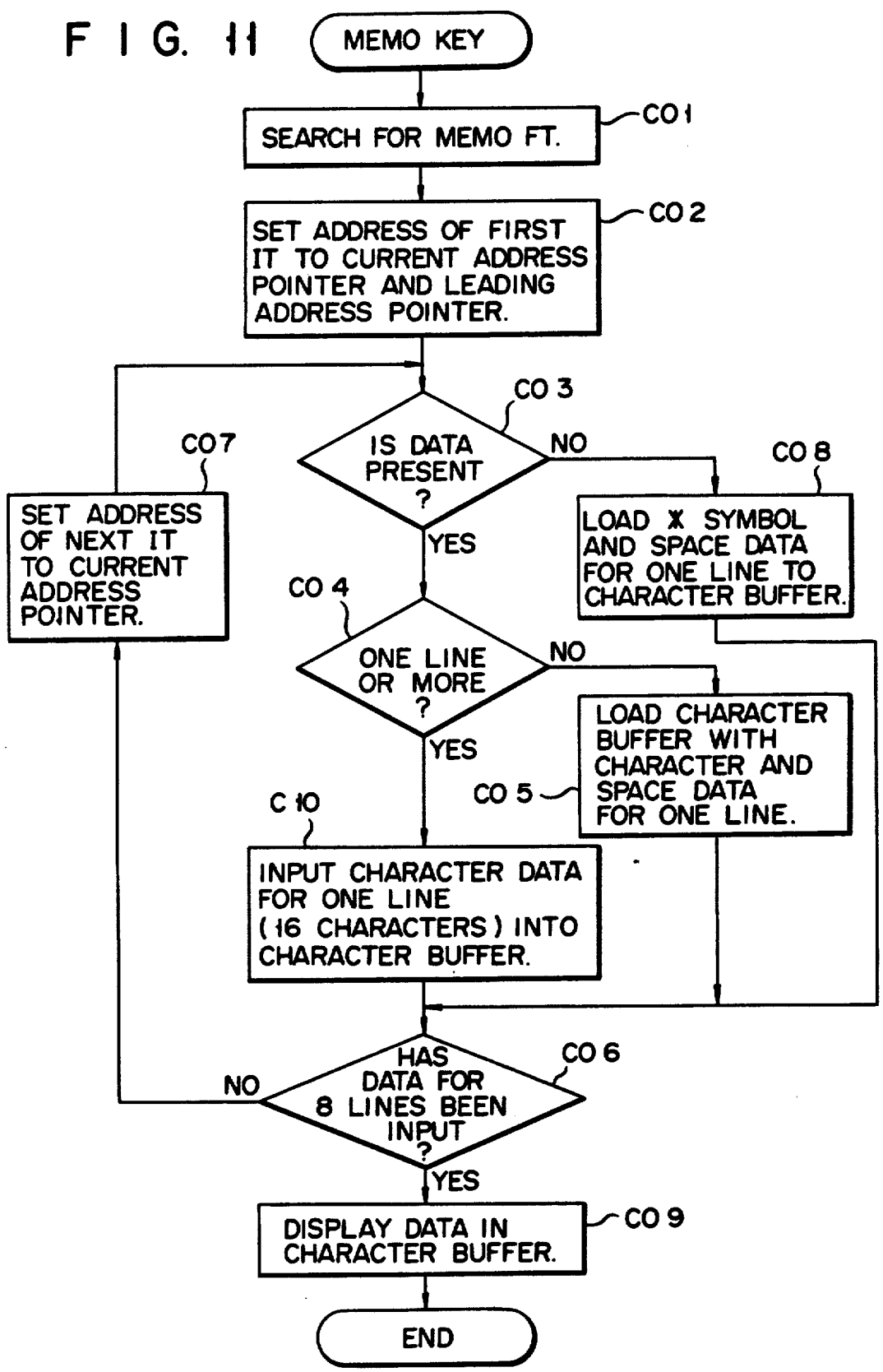
FIG. 11 shows a flowchart for explaining processing when a "MEMO" key is operated in the second embodiment.

First, when "MEMO" key 39e of keying section 39 is operated, a "MEMO" file in data RAM 53 is designated. Then, index display is performed on display section 54. FIG. 11 shows the processing operation in response to the operation of "MEMO" key 39e. At the beginning of the processing operation, in step C01, the "FT" codes attached to the leading positions of each file memory area are successively searched. Next, the "MEMO" file is detected according to the file name data "MEMO" located after the "FT" codes. In step C02, an address of the "IT" code is set to current address pointer 51a and leading address pointer 51b in addressing section 51. In step C03, it is determined whether or not character data has been entered, succeeding the "IT" code designated by current address pointer 51a. Assuming that the chemical formula for ethylene has been entered as the first image data, and the characters "ETHYLENE" have been entered, it is determined that there is character data. The flow then proceeds to step C04. In step C04, it is checked if the number of characters of this data exceeds the number for one line, or 16. In this case, there are only eight characters. Therefore, the answer is NO, and the flow proceeds to step C05. In step C05, eight space data is added to the eight character word "ETHYLENE". Then, this 16 character data is input to character buffer 52. In step C06, it is determined whether or not the character data entered into character buffer 52 amounts to eight lines. Here, the result of the determination is NO, and the flow proceeds to step C07. In step C07, a content of current address pointer 51a is updated to an address data of the next "IT" code. Then, the flow returns to step C03.

Assume that character data has been entered immediately following the "IT" code designated by current address pointer 51a. The chemical formula for propylene has also been entered as the second image data. The character data is "PROPYLENE", and therefore it is determined that character data is present, and the flow proceeds to step C04. Here, it is determined that the character data is not longer than one line of display section 54, or 16 characters. In step C05, seven space data is added to the nine characters of "PROPYLENE", and all this character data is input to character buffer 52. In the following step C06, it is determined whether or not the character data input to character buffer 52 amounts to 8 lines. Here, the answer is NO, and the flow proceeds to step C07. Here, a content of current address pointer 51a is updated to an address data of the next "IT" code. The flow then returns again to step C03.

By repeating steps C03 to C07 in this manner, the character data of the third image data having been input to the memo file will have space data attached, and will be stored in character buffer 52. Here the chemical formula for butylene has been entered as the third image data, and the word "BUTYLENE" has been entered as character data.

Image data of a drawing mode on tablet device 46 has been entered in the memo file as the fourth image data. Assuming that character data corresponding to this image data has not been entered, it will be determined in step C03 that there is no character data. Then, the flow goes to step C08. The asterisk "*" is used as a symbol to indicate that there is no character input. Fifteen space data are added to asterisk in order to form data for one line. This data is then stored in character buffer 52. After that, it is determined whether or not character data for eight lines were entered in character buffer 52 in step C06. When it is determined that stored character data is not eight lines, the processing starting from step C03 is repeated.

In this manner, character data, which becomes the index for successive image data, is entered in character buffer 52. When it is determined in step C06 that this data amounts to eight lines, the control proceeds to step C09. Here, character data for eight lines, stored in character buffer 52 and read out in response to a command from display control section 43, is displayed on display section 54 as indexes. Then, upon operation of "MEMO" key 39e the processes are completed, as described above.

When it is determined in step C04 that the stored character data consists of more than one line (16 characters), the control goes to step C10. Here, data for one line (or the first sixteen characters of the stored character data) is input to character buffer 52, and the flow proceeds to step C06.

Figure 12:
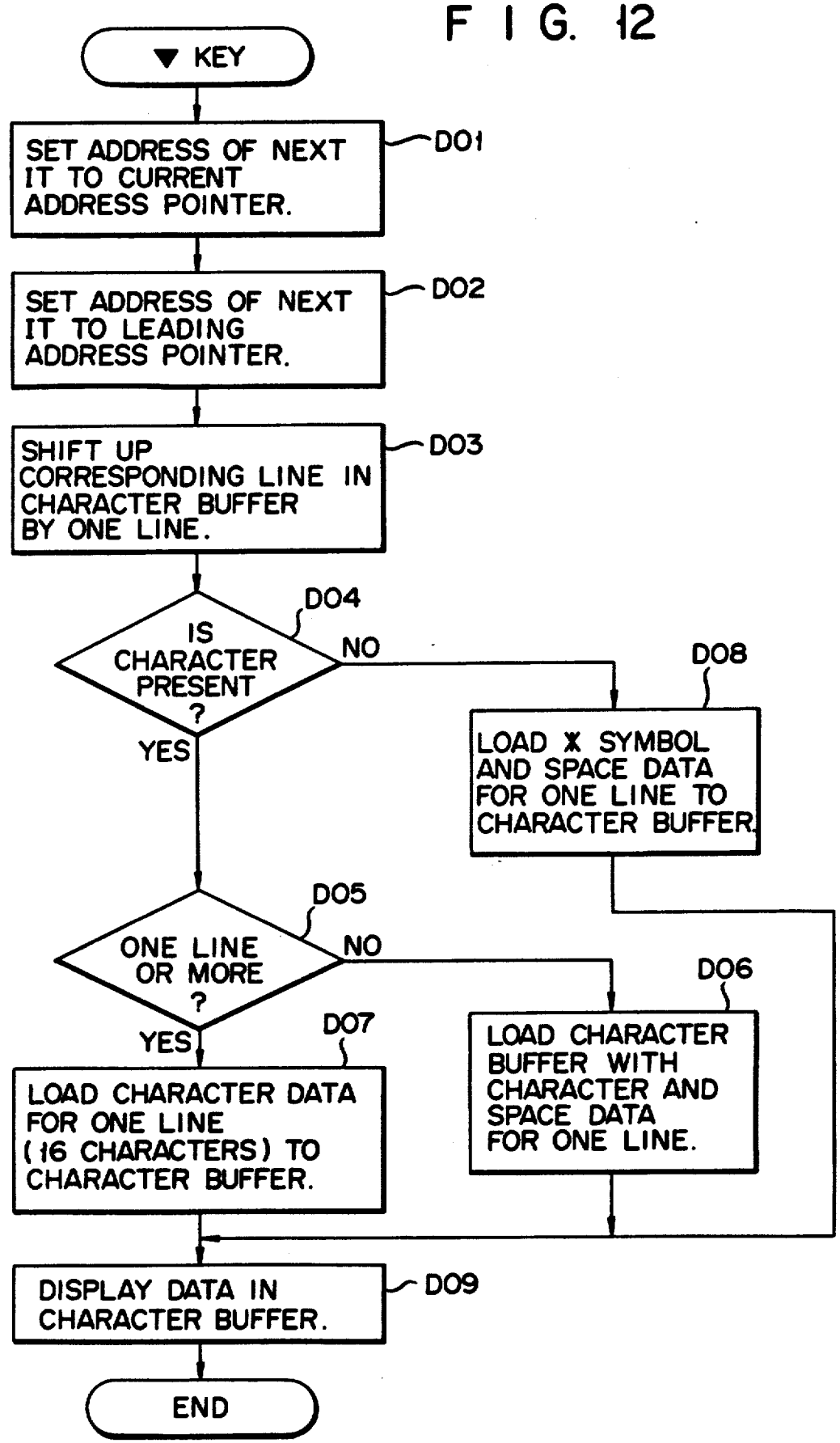
FIG. 12 shows a flowchart for explaining processing when a key for scrolling a display is operated in the second embodiment.

When character data as an index is displayed by display section 54, but the desired character data is not displayed, the display can be scrolled by operating key 39h and key 39i. FIG. 12 shows a process corresponding to the operation of key 39i. The start of the operation is shown in step D01. A content of current address pointer 51a, which designates the "IT" code corresponding to the character data displayed on a bottom line of display section 54, is changed to an address of the next "IT" code. In step D02, a content of leading address pointer 51b, which designates the "IT" code for the character data on a top line of display section 54, is changed to an address of the next "IT" code, in other words, of the "IT" code, corresponding to the character data, on a second line of the current display. In the following step D03, the displayed character data is upwardly shifted one line in accordance with the content of pointer 51b. At this time character data corresponding to a first line through a seventh line of display section 54 has been input to character buffer 52. In step D04, it is determined whether or not character data following the "IT" code designated by pointer 57a has been input. Here, if it is determined that character data has been input, the flow proceeds to step D05. Here it is determined whether or not the character data consists of more than one line of display section 54, or sixteen characters. If it is determined that there is not enough character data for one line, the flow proceeds to step D06. Here, enough space data is added to form sixteen characters, the space data added to character data is input to character buffer 52 as the character data of an eighth line. When it is determined that length of character data input in step D05 is larger than 16, the flow moves to step D07. Here only the leading sixteen characters is input to character buffer 52 as character data of the eighth line. When it is determined that there is no character data corresponding to the "IT" code in step D04, the flow proceeds to step D08. Here, an asterisk "*", which indicates that there is no character data, and fifteen space data are input to character buffer 52 as the character data of the eighth line. Then, after the character data of the eighth line is input to character buffer 52 in one of the steps D06 to D08, the character data in character buffer 52 is fed to display section 54. The character data for the first through eighth lines is displayed as the indexes, and the above process is completed.

Though not shown here, the process that is performed when key 39i is pressed is almost the same. The character data displayed in the first through seventh lines of display section 54 is shifted downward. Then, the new character data immediately preceding the character data of the first line will now be displayed.

Now, assume that the character data is displayed on display section 54 as the indexes, as shown in FIG. 13A. Here, if the character data "PROPYLENE" of the third line is designated by pressing on tablet device 46 of display section 54, operations as shown in FIG. 14 will be performed in response to an input to tablet device 46.

Figure 14:
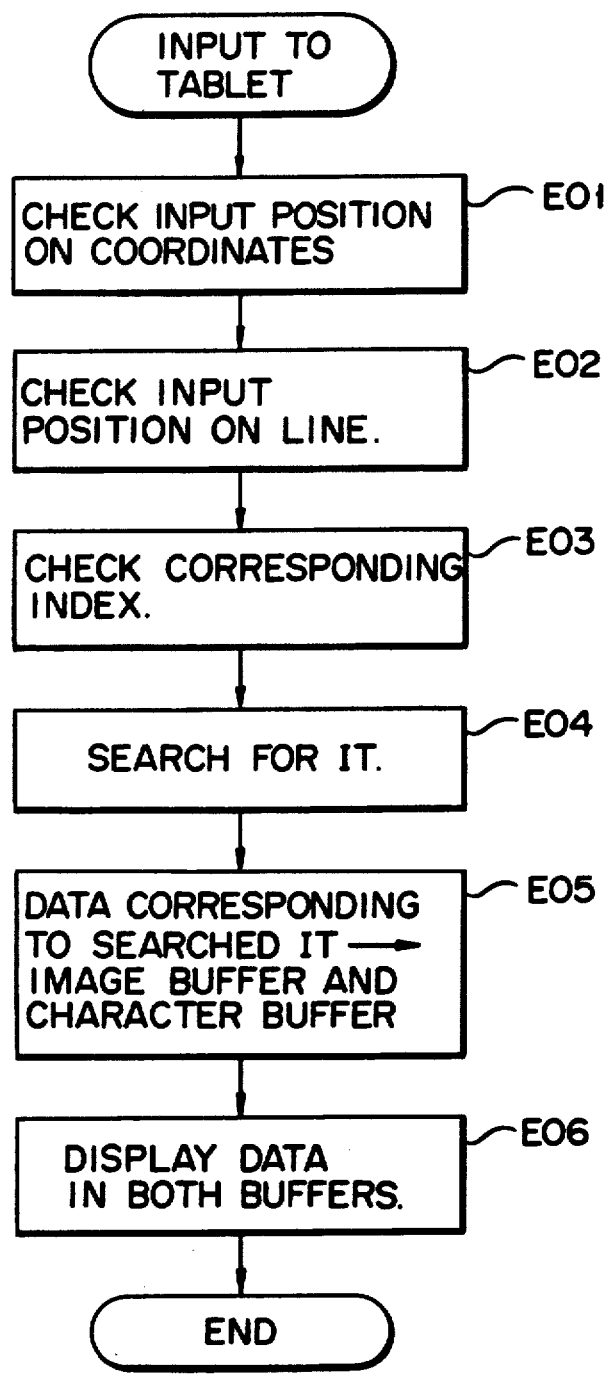
FIG. 14 shows a flowchart for explaining image data input processing to the image input tablet in the second embodiment.

In step E01 of FIG. 14, the signal output from tablet device 46 is converted to digital data by A/D converter section 48. Then, the converted data is input to position converter section 48. In section 48, the input position on tablet device 46 is determined as X-coordinate and Y-coordinate data based on the converted data. In step E02, it is determined that the line position of the coordinate data is the third line. The result of the determination is input to image input control section 49. In step E03, section 49 determines that the character data corresponding to the determination result and the signal from character input control section 41 is "PROPYLENE" as the index. In step E04, the "IT" code corresponding to this character data is searched in data RAM 53 while the content of pointer 51a is substituted by the content of pointer 51b. After the search is completed, the flow proceeds to step E05. The character data and the image data between the "IT" code designated by the content of pointer 51a and the next "IT" code are read out and written into image buffer 50 and character buffer 52, respectively. As shown in step E06, the data stored in image buffer 50 and character buffer 52 is sent input to display section 54 by display control section 43. Then, display section 54 displays the character data as the index and the corresponding image data. FIG. 13B shows the display state of display section 54. Character data "PROPYLENE" is displayed on the first line, and the chemical formula for propylene which was already input as image data is displayed on the second through eighth lines.

Assume that a pressure operation to the asterisk on the fifth line of tablet device 18 is performed, when the indexes are displayed as shown in FIG. 13A. In response to an input to device 46, in the same manner as described above, the processing operations shown in FIG. 14 are performed. However, in this case, in step E04, an "IT" code having no character data is searched. As shown in FIG. 13C, because no character data has been entered, only image data is searched from data RAM 53. Then, this image data that has been searched is written into image buffer 50, and displayed by image section 54.

A third embodiment of this invention will now be described, with reference to FIGS. 15 and 20.

Figure 15:
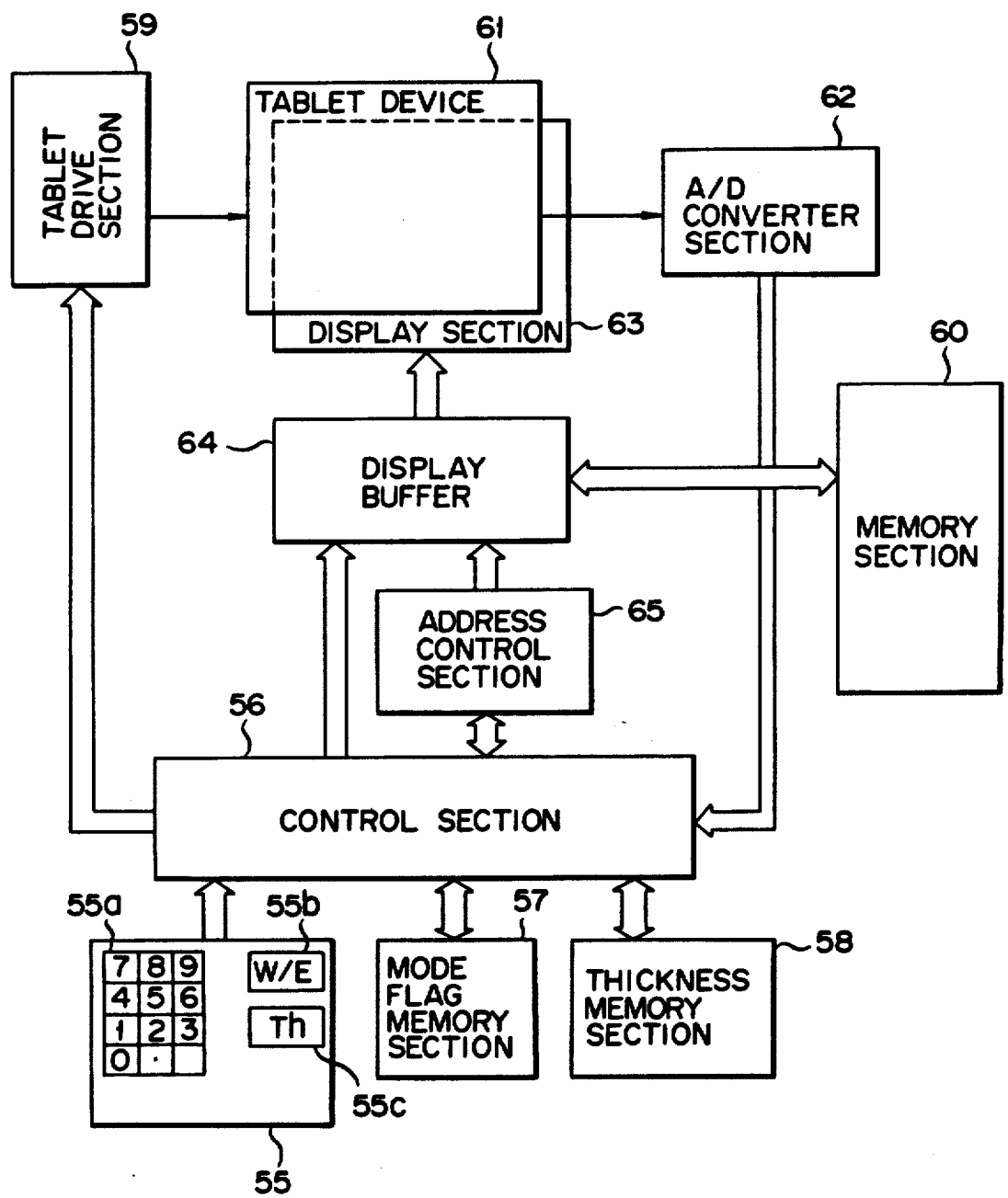
FIG. 15 shows a block diagram of a pocket size data storage apparatus, with a tablet device for inputting image data, according to a third embodiment of this invention.

FIG. 15 shows a block diagram of the third embodiment according to the present invention. Keying section 55 comprises ten keys 55a, write/erase mode select key W/E 55b and thickness designation key TH 55c. W/E 55b alternately selects the write mode and the erase mode for every depression.

The output of keying section 55 is sent to control section 56. Section 56 includes such components as a ROM. Section 56 stores various types of control programs for controlling each circuit, according to the key input by keying section 55. Control section 56 sets either a write mode flag or an erase mode flag in mode flag memory section 57, according to the operation on W/E key 55b of keying section 55. After TH key 55c is operated, control section 56 applies a numeral input from ten keys 55a to thickness memory section 58 as a thickness setting value. Control section 56 supplies a control command to tablet drive section 59. Moreover, control section 56 supplies data read and write commands to memory section (RAM) 60.

Figure 16:
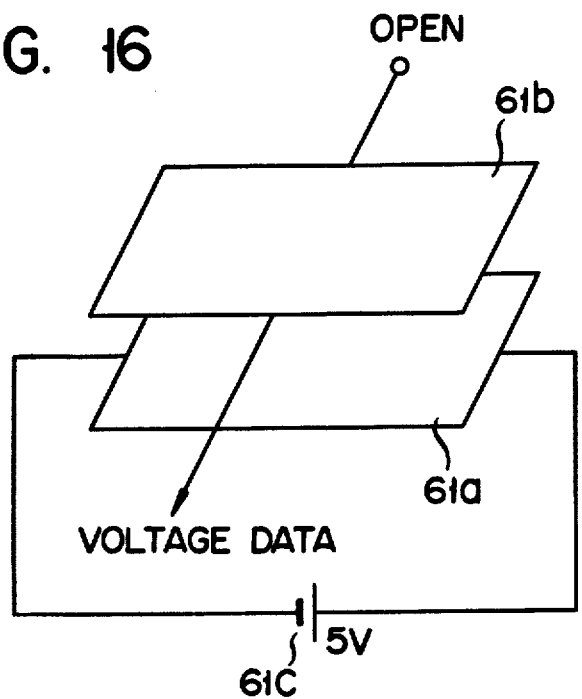
FIG. 16 shows a schematic illustrating the tablet device in the third embodiment.

Tablet drive section 59 applies a drive signal to tablet device 61. As shown in FIG. 16, tablet device 61 comprises two ITO (indium oxide) films 61a and 61b and a spacer (not shown) located therebetween. A fixed voltage, e.g. 5 V, from power supply 61c, under control by tablet drive section 59, is applied to the opposite ends in one direction of one of the ITO films 61a and 61b. At the same time, one of the opposite sides of the other film in the direction orthogonal to the voltage applied direction of the one film, is electrically opened. This operation is applied alternately to the pair of ITO films at a predetermined timing. As shown in the figure, when voltage is applied to ITO film 61a and the one side of ITO film 61b is left open, if tablet device 61 is pressed at one position, the voltage applied to ITO film 61a is resistor-divided, and voltage data is obtained at the side end opposite to the open side of ITO film 61b. The obtained voltage data is converted into digital data by A/D converter section 62. The coordinate data representing the pressed position of tablet device 61 is thus obtained. At the next timing, when voltage is applied to ITO film 61b in the direction orthogonal to the voltage applied direction of film 61a, and the one end of ITO film 61a is left open, a similar operation is done. The obtained voltage data is converted into a digital data. From these two digital data, a pair of the X-coordinate and the Y-coordinate at the pressed position on tablet device 61 is obtained. These coordinate data are applied to address control section 65 via control section 56. Address control section 65 sets the address of display buffer 64 for determining the displayed dot on the basis of the numeral N stored in thickness memory section 58.

Display section 63 is a liquid-crystal display device made of, for example, a 96×64 dot matrix. Each dot is designated by X- and Y-coordinate values. Display buffer 64 contains registers, each corresponding to one dot. Each register is addressed by coordinate data from A/D converter section 62. Either display data or erase designation data is input to the register addressed based on data in mode flag memory section 57, and the corresponding dot is turned on or off. In this case, when "1" is input to the register of display buffer 64, the corresponding dot is turned on, and when "0" is input, the corresponding dot is turned off.

The operation of this embodiment thus constructed will be described with reference to a flowchart in FIG. 17.

The write operation of image data will be described. In step F1, it is determined whether W/E key 55b of keying section 55 is operated or not. If it is operated, a flow goes to step F2. In step F2, it is determined whether a current mode is the write mode or not by a write mode flag. If the write mode flag is absent, the flow goes to step F3, and the write mode flag is set to mode flag memory section 57. Then, the flow returns to step F1. Next, the thickness of a display and the answer NO is given in step F1. In step F4, it is determined whether TH key 55c is pressed or not. The answer YES is given in step F4, and the flow goes to step F5. Thickness is set, according to the numeral N input by ten keys 55a. The numeral N as input by keys 55a is stored in thickness memory section 58. Then, the flow goes back to step F1.

In steps F1 and F2, if the answer NO is given, the flow proceeds to step F6. In step F6, input operation to tablet device 61 is done. Assume that a desired position on tablet device 61 is pressed. The flow, then, goes to step F7. In step F7, a voltage signal representing the coordinates of the pressed position on tablet device 61 is obtained. The obtained signal is applied to A/D converter section 62.

In step F8, the mode, or the content in mode flag memory section 57, is checked. In this case, the write mode flag is set in section 57, and, therefore, control goes to step F9.

Figure 18:
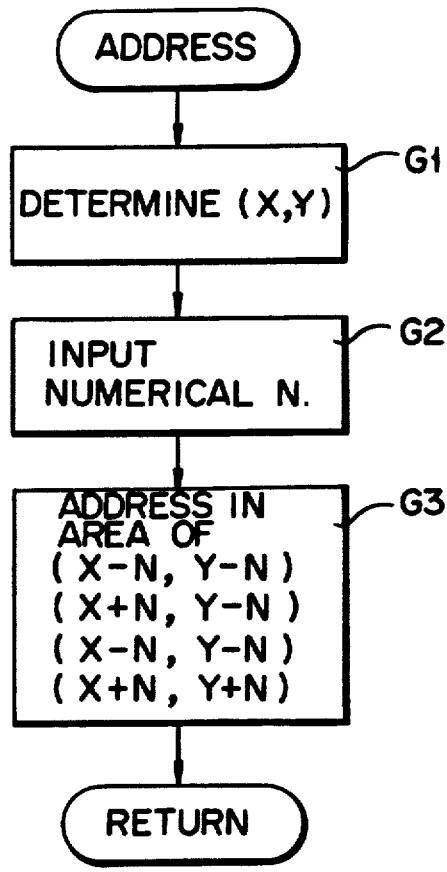
FIGS. 17 and 18 show flowcharts for explaining the operation of the third embodiment.

In step F9, the data converted by A/D converter section 62 is applied to address control section 65. Display buffer 64 is addressed, according to the converted data from A/D converter section 62, and the display data "1" is written in buffer 64. Addressing operation is performed according to the flowchart in FIG. 18. First, if the digital coordinate data (X, Y) is determined by A/D converter section 62 in step G1, the flow goes to step G2. A numeral N stored in thickness memory section 58, is read out, and the flow proceeds to step G3. In step G3, using the numeral N in thickness memory section 58, an area defined by (X−N, Y−N), (X−N, Y+N), (X+N, Y−N), and (X+N, Y+N), are calculated, and the coordinate data of each dot in the calculated area is designated as the address of the display buffer 64. "1" is loaded into the designated address, by section 65, of the display buffer 64. For example, when the numeral N in memory section 58 is "2", if the input is made to the position of X=20, Y=20, the area as defined by (18, 18), (18, 22), (22, 18) and (22, 22) is designated as the address of display buffer 64.

Figure 17:
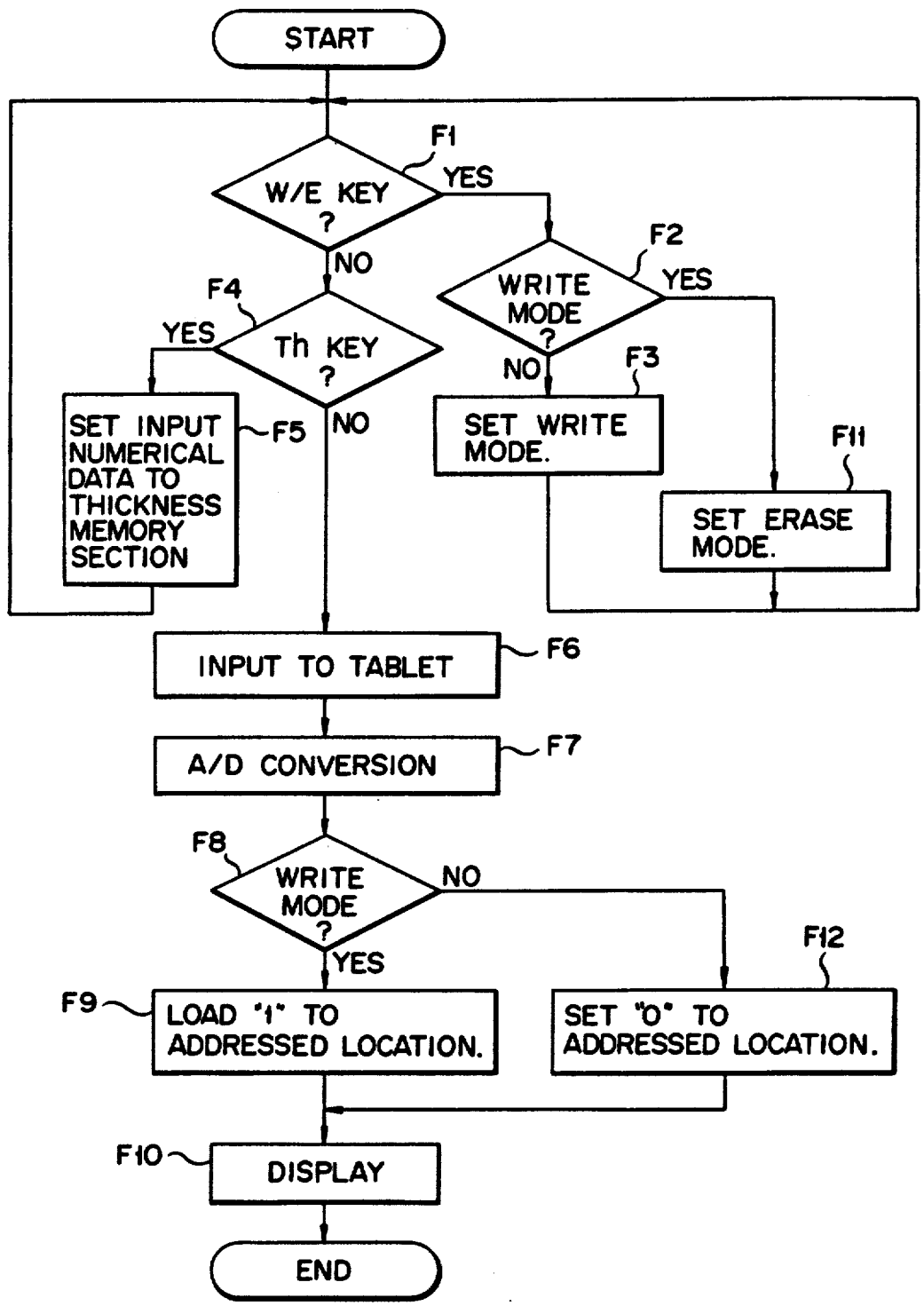
Figure 19:
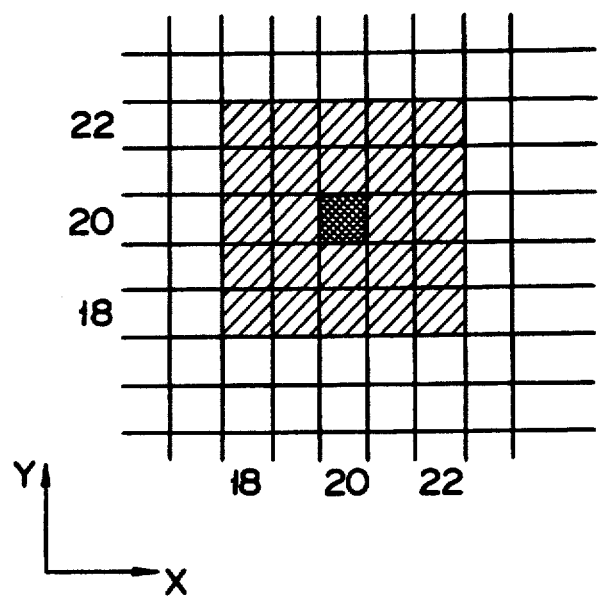
FIGS. 19 and 20 show diagrams for explaining the operation of the third embodiment.

In step F10 in FIG. 17, the dots, of display section 63, corresponding to the designated address of display buffer 64 are turned on, according to the proceeding operation as described above. At that time, the display data in display buffer 64 is also stored in memory section 60.

Figure 20:
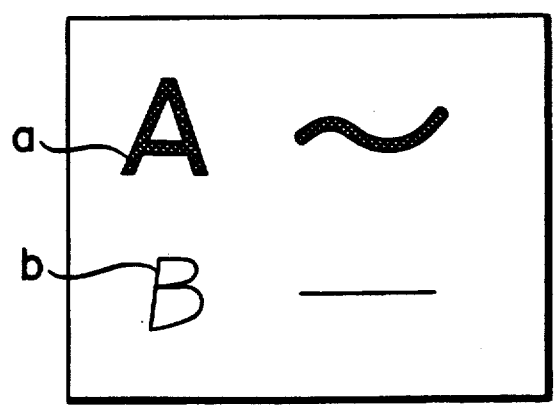

By continuing the input operation to tablet device 61, image data with line thickness can be displayed on display section 63, as shown in "a" in FIG. 20.

When TH key 55c is pressed and numeral "0" is input, the thickness of the line is designated as one dot. After that, if image data is input to tablet device 61, the image data is displayed in thin lines, as shown in "b" in FIG. 20.

The operation to erase the displayed image data will be described. First, in step F1, it is checked whether W/E key 55b of keying section 55 is operated or not. If the answer is YES, in step F2 it is determined whether the current mode is the write mode or not. If the write mode flag is present, the answer is YES, and the flow goes to step F11. The erase mode flag is set to mode flag memory section 57, and the write mode flag is lowered. Then, the flow returns to step F1. Next, the thickness of an erase line is set. For this purpose, TH key 55c is pressed. In step F1, the answer NO then is given. Subsequently, in step F4, it is determined whether TH key 55c has been operated or not. When the answer YES is given in step F4, the flow advances to step F5. Thickness is designated by the numeral N input by ten keys 55a, and the numeral N input by ten keys 55a is stored in thickness memory section 58. Then, the flow returns to step F1.

If both answers are NO in steps F1 and F4, the flow advances to step F6. In step S6, input operation is done to tablet device 61. Tablet device 61 is pressed at the position corresponding to the displayed portion to be erased. Then, the flow goes to step F7. An electrical signal representing the coordinates of the pressed position on tablet device 61 is obtained, and this obtained signal is applied to A/D converter section 62.

In step F8, the flag of mode flag memory section 57 is checked. In this case, since the erase mode flag is set to memory section 57, the flow goes to step F12.

In step F12, the data A/D-converted by section 62 is applied to address control section 65. Display buffer 64 is addressed, according to the digital coordinate data from section 62. In this case, as described above referring to FIG. 18, the digital coordinate data (X, Y) by section 62 is determined in step G1, and the flow goes to step G2. The numeral N stored in memory section 58 is read out, and the flow advances to step G3. In step G3, based on the numeral N in memory section 58, the area defined by (X−N, Y−N), (X−N, Y+N), (X+N, Y−N), and (X+N, Y+N) is calculated, and display buffer 64 is addressed according to the calculated area. In the address location of display buffer 64 addressed by address control section 65, erasure data "0" indicating no display is input. By this input, in step F10, a dot, on display section 63, corresponding to the address location of display buffers 64 is turned off. The erasure data in display buffer 64 is also applied to memory section 60, and the stored display data is erased.

If another erasure input is applied from tablet device 61, the corresponding dots on display section 63 are turned off with an input line thickness.

The desired thickness of the displayed line can be selected. Therefore, a variety of image data can be depicted with lines having different line thicknesses. The thickness of a line to be displayed or erased can be designated in a single operation, by input numeral data, succeeding the operation of TH key 55c. An identical key must be repeatedly operated to designate a desired thickness of a display line in the conventional apparatus. Therefore, the operation needed for inputting and erasing image data in the apparatus of the present invention is very simple, compared with that in the conventional apparatus. Operability of such an operation is therefore increased. Further, by selecting a line slightly thicker than the line to be erased, the erasure of a displayed line can be securely performed with only a single erasure operation.

This invention is not limited to the above-mentioned embodiment alone, but can be variously modified within the scope of this invention. For example, in this embodiment, the numeral designating the desired thickness is written in the thickness memory section. Operation for designating the thickness can be made simpler, in the following method. Data is prestored in the thickness memory section, and the setting of thickness is done merely by designating either "thick" or "thin". As described above, this invention is applied to not only a small electronic calculator, but other small electronic apparatuses.

A fourth embodiment of this invention will be described with reference to FIGS. 21 to 27.

Figure 21:
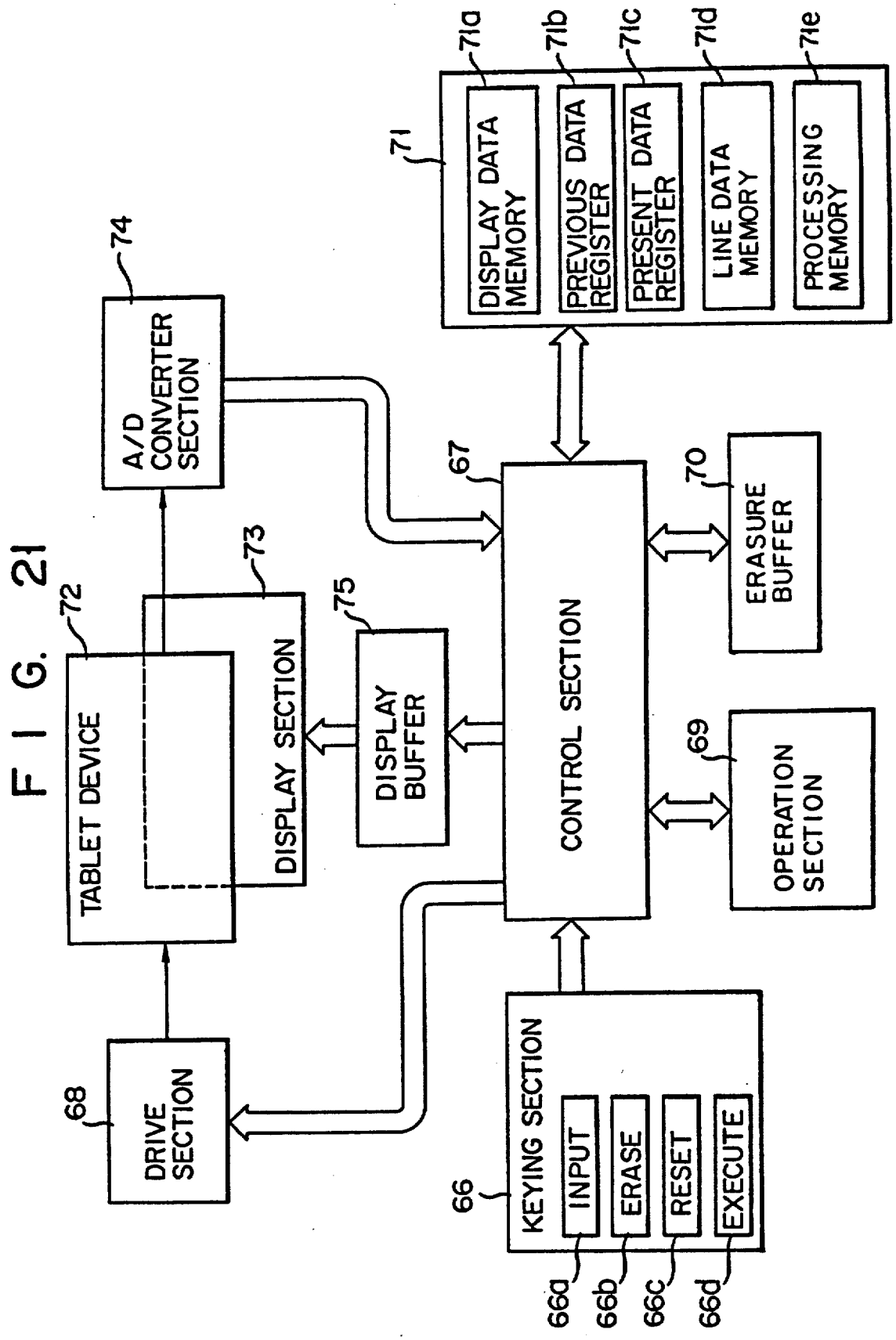
FIG. 21 shows a block diagram of a pocket size data storage apparatus, with a tablet device for inputting image data, according to a fourth embodiment of this invention.
Figure 22A:
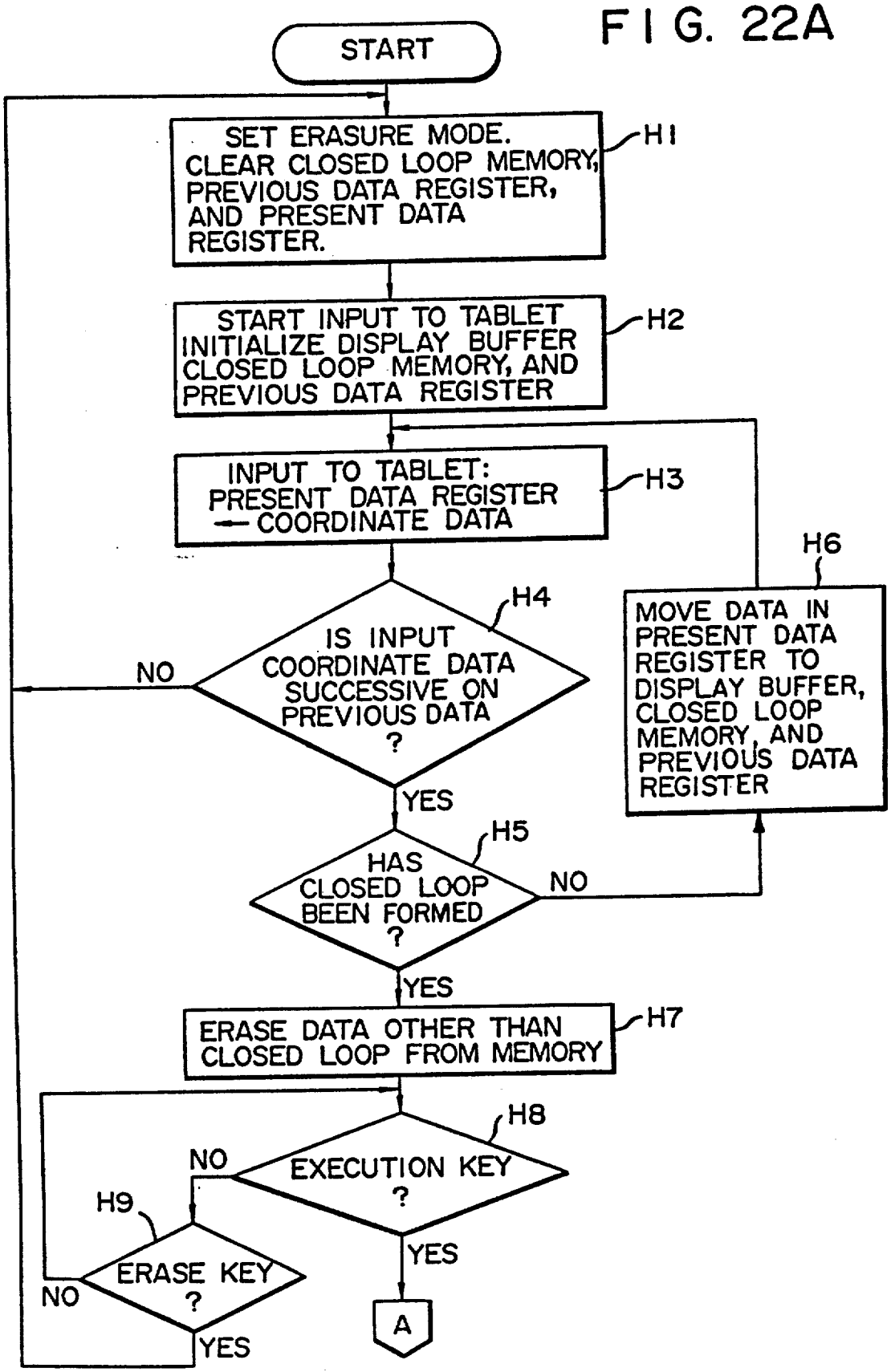
FIGS. 22A and 22B show a flowchart for explaining operation of the fourth embodiment.
Figure 22B:
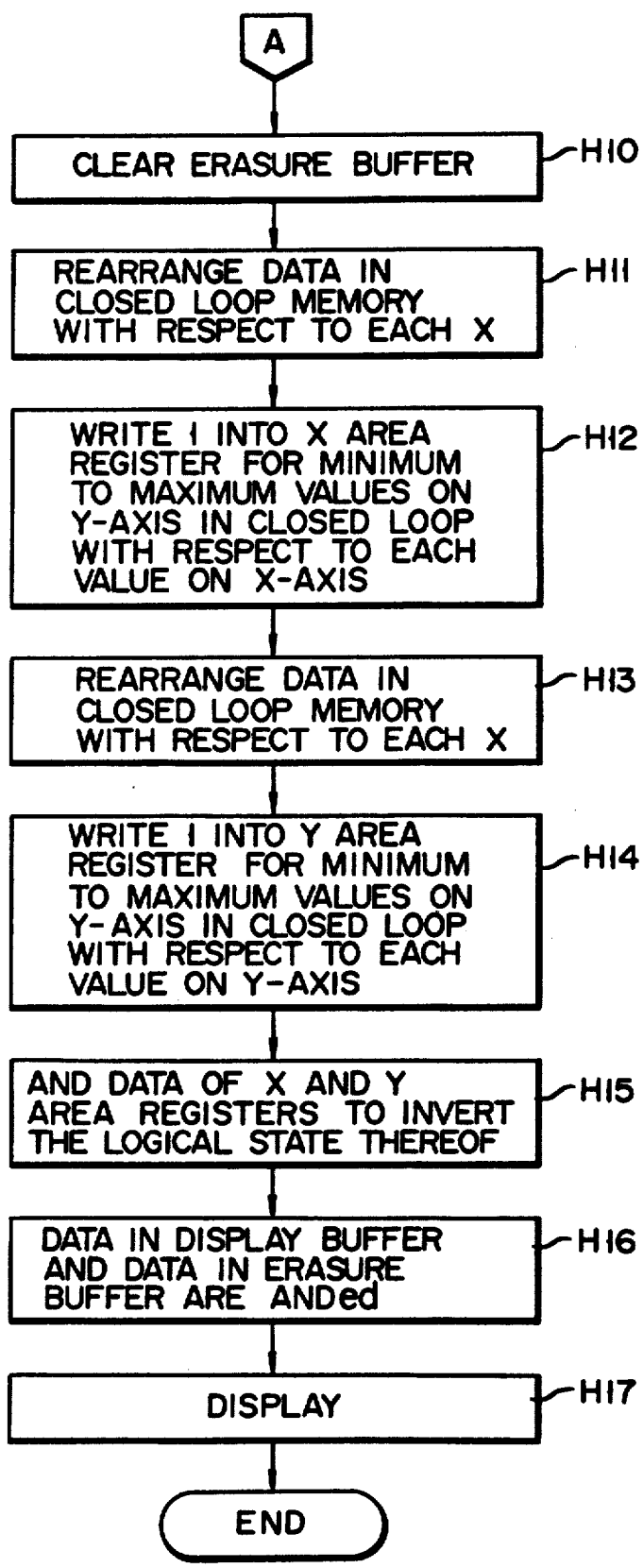

FIG. 21 shows a circuit configuration of the fourth embodiment. In FIG. 21, keying section 66 includes input key 66a, erase key 66b, reset key 66c, and execute key 66d or the like.

An output from keying section 66 is sent to control section 67. Control section 67 is composed of a ROM, and for example, stores various types of control programs for controlling respective circuit sections according to the key operation in keying section 66. Control section 67 gives control commands to tablet drive section 68, arithmetic/logical operation circuit 69, and erasure buffer 70. Control section 67 further generates commands for exchange of data in memory section 71.

Drive section 68 applies a drive signal to tablet device 72. This device 72 is constructed, such that a pair of transparent resistance sheets are arranged face-to-face, with a spacer therebetween. Tablet device 72 is placed on the display surface of display section 73 in a predetermined relationship, i.e., a one-to-one corresponding manner, to allow the displayed data of display section 73 to be seen. When a drive signal from drive section 68 is alternately applied to the resistive sheets, if tablet device 72 is pushed at a position corresponding to a desired position on display section 73, for example, by a finger tip, an electrical signal is produced which corresponds to voltage divided based on a ratio of resistors at the pressed position. The electrical signal is sent to control section 67 through A/D converter section 74, as coordinate data.

Operation section 69 exchanges data with memory section 71, and calculates a dot position on the screen of display section 73. Then, section 69 loads the calculated dot position to display buffer 75 and erasure buffer 70.

Memory section 71 comprises display data memory 71a, previous data register 71b, present data register 71c, closed loop memory 71d, and processing memory 71e. Display data memory 71a stores display data. Previous data register 71b stores previous coordinate data from tablet device 72. Present data register 71c stores the present coordinate data from table device 72. Closed loop memory 71d stores coordinate data input from tablet device 72 to form the closed loop.

Display buffer 75 temporarily stores the display data applied from control section 67 and causes display section 73 to display the data. In this instance, display section 73 employs a dot matrix of 18×12. Display buffer 75 includes registers of 18×12 corresponding to the number of the display dots. The display data are loaded into these registers respectively.

Erasure buffer 70 stores an area data of the display data to be erased on display section 73. Buffer 70 includes X- and Y-area registers for storing the area data. Each of these area registers has the capacity for one screen of display section 73.

The operation of the embodiment thus arranged will be described.

Figure 23:
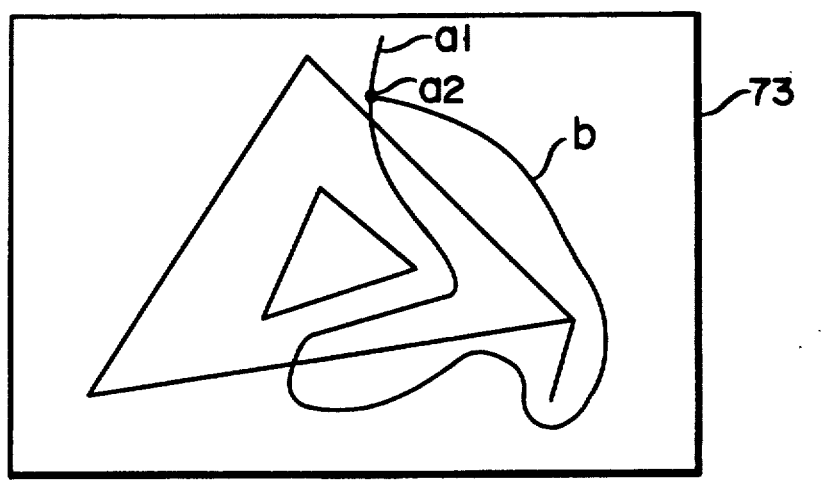
FIGS. 23 to 27 show diagrams for explaining the erasure operation of the fourth embodiment.

Assume that a figure, displayed by display section 73, shown in FIG. 23 is partially erased. In step H1 of the flowchart in FIG. 22, erase key 66b in keying section 66 is operated to set up an erasure mode. By operation of key 66b, previous data register 71b, present data register 71c, and closed loop memory 71d in memory section 71 are all cleared.

In step H2, the input operation to tablet device 72 is initiated. Tablet device 72 is pressed to set up the start position of the erasure area. Upon pressing, tablet device 72 outputs an electrical signal representing the coordinates of the pressed position thereon. The electrical signal is applied as coordinate data to control section 67, through A/D converter section 74. Then, operation section 69 performs an appropriate operation to calculate the dot position, on the screen of display section 73, corresponding to the input coordinate data. This calculated position data is transferred as an initial data to display buffer 75 and memory section 71. In display buffer 75, the position data is loaded into the corresponding register, so that the first input position is displayed by display section 73, as shown by a1 in FIG. 23.

In memory section 71, the initial data is loaded into closed loop memory 71d and present data register 71b.

Then, the flow advances to step H3. In step H3, the next position is pressed on tablet device 72. Then, tablet device 72 produces next coordinate data. The next position data corresponding to the next coordinate data is loaded into present data register 71c of memory section 71.

Step H4 is executed, and it is checked if the coordinate data input by tablet input section 72 is successive. In a case where data stored in previous data register 71b can be represented as (X, Y), if present data (X, Y) in present data register 71c is within the area defined by $X-1 \leq X \leq X+1$ and $y-1 \leq 3Y \leq y+1$, it is determined that the present data is successive. If the answer is YES in step H4, the flow goes to step H5. If the answer is NO, the flow returns to step H1, and the erasure area setting is started again.

If it is determined that the coordinate data are successive, in step H5, it is checked whether or not the successive coordinate data has formed a closed loop. The check is made by determining whether or not the same data as the present data is contained in the data stored in closed loop memory 71d.

If it is determined in step H5 that the closed loop is not formed, the answer is NO, and the flow goes to step H6. In step H6, the present data in present data register 71c is loaded into display buffer memory 75, closed loop data memory 71d, and previous data register 71b. As a result, the next input coordinate position is displayed on display section 73.

As the input position on tablet device 72 is moved so as to enclose a portion to be erased, as indicated by a path "b" in FIG. 23, the operation in steps H3 to H6 is repeated, so that the coordinate data corresponding to the input position is sequentially written into closed loop memory 71d.

Then, in step H5, when the same data as the present data is present in the data stored in closed loop memory 71d, the CPU determines that the closed loop is formed, and the flow advances to step H7.

Figure 24:
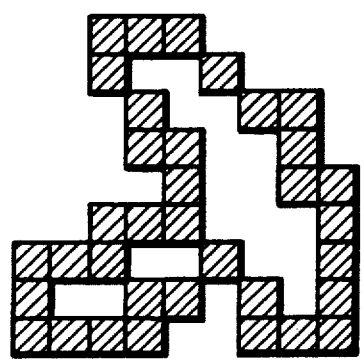

In step H7, the data other than the closed loop is removed from closed loop memory 71d. In other words, if the curve is started from position a1, and a closed loop is formed at position a2, the data between positions a1 and a2 is removed. As a result, display section 73 presents the display as shown in FIG. 24. At this time, the coordinates data corresponding to the input positions applied from tablet device 72, as shown in FIG. 24, are written into closed loop memory 71d.

Then, the flow goes to step H8. In step H8, it is checked if an input of execution key 66d in keying section 66 is present. In this case, if no key operation is performed, the answer is NO, and the flow goes to step H9. In step H9, it is checked if an input of erase key 66b in section 66 is present. In this case, if no key operation is present, the answer is NO, and the flow returns to step H8. Thus, until either key 66b or 66d is operated, the processing of steps H8 and H9 is repeated, and the apparatus is in standby mode.

In step H9, if the input of erase key 66b is present, the flow goes back to step H1, and all data is cleared, and the erasure area setting is started gain. If the input of execution key 66d is present in step H8, the flow goes to step H10.

Figure 25:
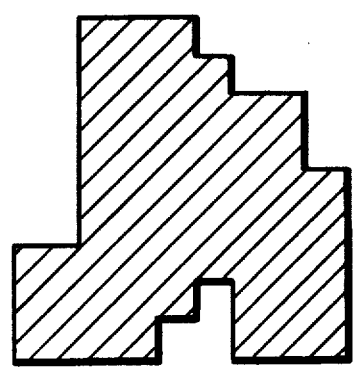

In step H10, the content of erasure buffer 70 is cleared. Then, step H11 is executed. In step H11, the data in closed loop memory 71d is rearranged between minimum and maximum values on the y-axis for each X value. The arranged data is supplied to processing memory 71e. The flow goes to step H12. "1" is written into the X-area register of erasure buffer 70 for the rearranged data in processing memory 71e. In other words, the contents of the minimum to maximum values in the Y-direction are all set to "1" with respect to the respective values in the X-direction in erasure buffer 70 for the data stored in closed loop memory 71d, as shown in FIG. 24. Therefore, the contents in the X-area register of buffer 70 are as shown in FIG. 25.

Figure 26:
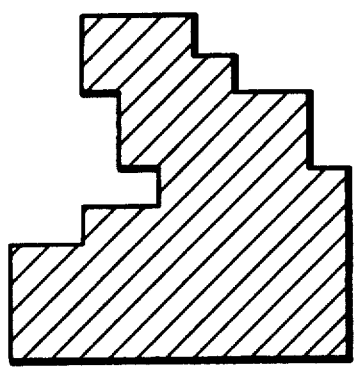

Then, CPU executes step H13. In this step, the data in closed loop memory 71d is rearranged between minimum and maximum values on the x-axis for each Y value. The rearranged data is stored into processing memory 71e. Then, the flow goes to step H14. In this step, "1" is written into the Y-area register of erasure buffer 70 for the rearranged data in processing memory 71e. In other words, the content of the minimum to maximum values in the X-direction are all set to "1" with respect to respective values in the Y-direction in erasure buffer 70 for the data stored in closed loop memory 71d, shown in FIG. 24. The contents in the Y-area register of erasure buffer 70 are as shown in FIG. 26.

Figure 27:
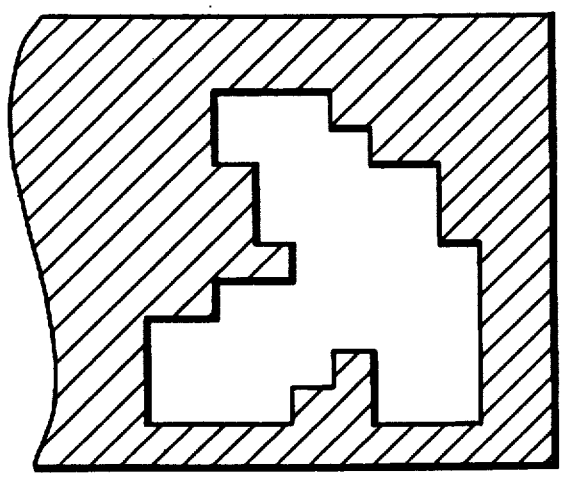

Then, step H15 is executed. In step H15, the data in the X-area and Y-area registers of erasure buffer 70 are ANDed. The ANDed result is logically inverted. The inverted state is shown in FIG. 27.

Step H16 is executed. In this step, the data in display buffer 75, shown in FIG. 23, and the data in erasure buffer 70, obtained in step H15, are ANDed in display buffer 75, to remove the portion corresponding to the data of erasure buffer 70 from the data of display buffer 75. In step H17, display section 73 is driven to display the ANDed data of display buffer 75 at this time. The figure shown in FIG. 23 is displayed whose portion enclosed by the successive input positions on tablet device 72 is removed.

As seen from foregoing, to erase a part of the display data, for example, a figure displayed on the display screen, an image is input from tablet device 72 so as to enclose the portion of the figure to be erased. CPU checks whether or not the input data graphically forms a closed loop. If the closed loop is formed, the data within the closed loop of the display buffer is erased. Therefore, the erased portion of the display data can be erased at one time by a simple image input operation. Accordingly, if the portion to be erased extends in a wide area or is complicated in shape, it can be erased in short time. Operability of the tablet device in entering image data is further improved.

It should be understood that this invention is not limited to the above-mentioned embodiments, but may be appropriately modified within the scope of this invention. In step H15, the data in the X-area and Y-area registers of erasure buffer 70 are ANDed and the ANDed result is logically inverted. The inverted data is ANDed with the content of display buffer in step H16. Alternately, the logical inversion is not performed in step H16, and the data in the X-area and Y-area registers is ORed with the data of display buffer 75. In this way, the data can be set in display buffer 75. This indicates that a part of the display data in the display section can be masked. The effect equivalent to the erasure of the display data can be attained.

A fifth embodiment of this invention will be described with reference to FIGS. 28 through 34.

A circuit configuration of the fifth embodiment is illustrated in FIG. 28. Keying section 76 contains various keys: ordinary numeral keys, function keys, character keys, and symbol keys, location key 76a for checking a display location, and shift keys 76b, 76c, 76d and 76e denoted as "←", "→", "↓" and "↑". The signals generated by operating these keys are transferred to CPU 77. CPU 77 controls the operation of the circuits other than the keying section 76, according to the key operation signal derived from keying section 76. CPU 77 contains V register 77a for storing code "V" representing a vertical position, in a vertical direction, of displayed image data, H register 77b for storing code "H" representing a horizontal position, in a horizontal direction, of the image data, L00, L01, L10, and L11 registers 77c, 77d, 77e, and 77f for storing the codes representing a display location mark, which are used for checking a display location. V register 77a and H register 77b each have a memory capacity of 1 bit, for example. With 2×2, the four segmental image data can be processed as one related image data. CPU 77 transfers data to and from display RAM 78, expansion RAM 79, and bank memory 80, and sends the one segmental image data for one screen to display buffer 81, and a control signal to tablet control section 82. Display RAM 78 stores the image data to be displayed. Expansion RAM 79 stores a plurality of related segmental image data. Bank memory 80, composed of a RAM, stores all of the input image data. Display buffer 81 holds the image data to be displayed on display section 83, and has a memory capacity of 96×64 bits, for example, which depends on the display ability of display section 83. According to an instruction from CPU 77, the image data stored therein is output to display section 83. Display section 83 is made up of liquid crystal display elements, which are arrayed in a 96×64 dot matrix. Display section 83 displays the image data sent from display buffer 81. Tablet device 84 is formed on display section 83 as one unit. Tablet device 84 is composed of a pair of transparent electrode plates. These electrode plates are placed facing each other, with a spacer located therebetween. These electrodes are supplied with a control voltage from tablet control section 82, which is operated in accordance with a control signal from CPU 77. When a writing pressure is applied on tablet device 84 to input image data, X- and Y-coordinate data at the pressed point on tablet device 84 are detected and sent in the form of analog voltage signals to A/C converter 85. Converter 85 converts the analog voltage signals into digital signals with the resolution of about "384" dots for X-coordinate and "256" dots for Y-coordinate. The digitized signals are then applied to CPU 77.

Figure 29:
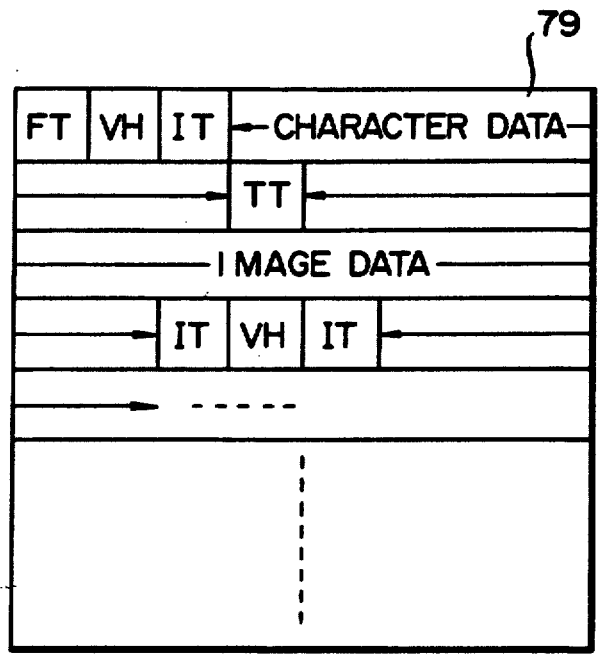
FIG. 29 shows a memory map of an expansion RAM in the fifth embodiment.

A storage format of the image data in expansion RAM 79 will be described with reference to FIG. 29. As shown in FIG. 29, a partition code "FT" for partitioning image data blocks is located in the leading address of expansion RAM 79. "V" and "H" codes (referred to as "VH" code hereinafter) follows to the partition code. The "VH" code is followed by another partition code "IT" and character codes. The character codes represent character data contained in the image data. An additional partition code "TT" is located following the character codes. The actual image data input by a writing operation on tablet device 84 is stored following the partition code "TT".

The one segmental image data has the format of "FT", "VH", "IT", "Character data", "TT", and "Image data". The plurality of related segmental image data are input to expansion RAM 79.

The operation of the fifth embodiment as described above will now be described.

Figure 30:
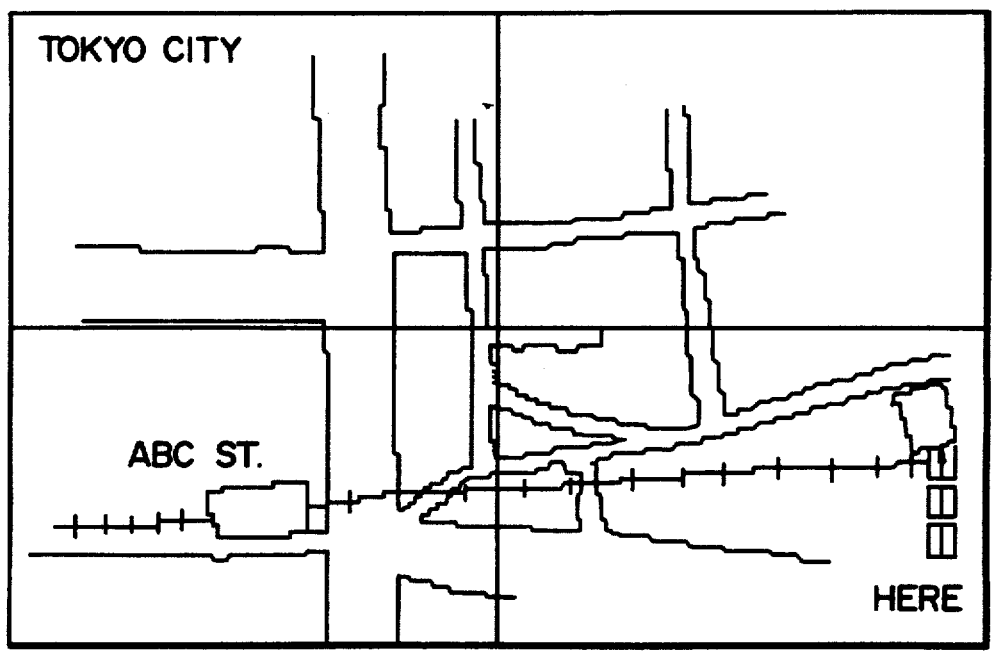
FIG. 30 shows a view representing the entire input image data in the fifth embodiment.

It is assumed that a map shown in FIG. 30 has been input as image data by a writing operation on tablet device 84. After the image data is input, "T", "0", "K", "Y", "0", "C", "I", "T", "Y" are keyed in and displayed on the left upper section of the screen. "A", "B", "C", "S", "T", "." on the left lower section of the screen, and "H", "E", "R", "E", "+", "|", and "|" on the right lower section. These characters and symbols are entered by using character keys and symbol keys, which are provided in keying section 76.

When the four related segmental image data shown in FIG. 30 have been stored in bank memory 80, the one segmental image data is read out and is displayed by display section 83. When the image data displayed on display section 83 is a lower right segment of the image data stored in bank memory 80, as shown in FIG. 31D, the one segmental image data is stored in display RAM 78. CPU 77 reads out the one segmental image data from RAM 78, and transfers it to display section 83. At this time, the remaining three segmental image data of the upper left, upper right, and lower left sections are still stored in RAM 79. V and H registers 77a and 77b store code "1" (referred to as "1,1"), representing the location of the image data currently displayed.

Figure 32A:
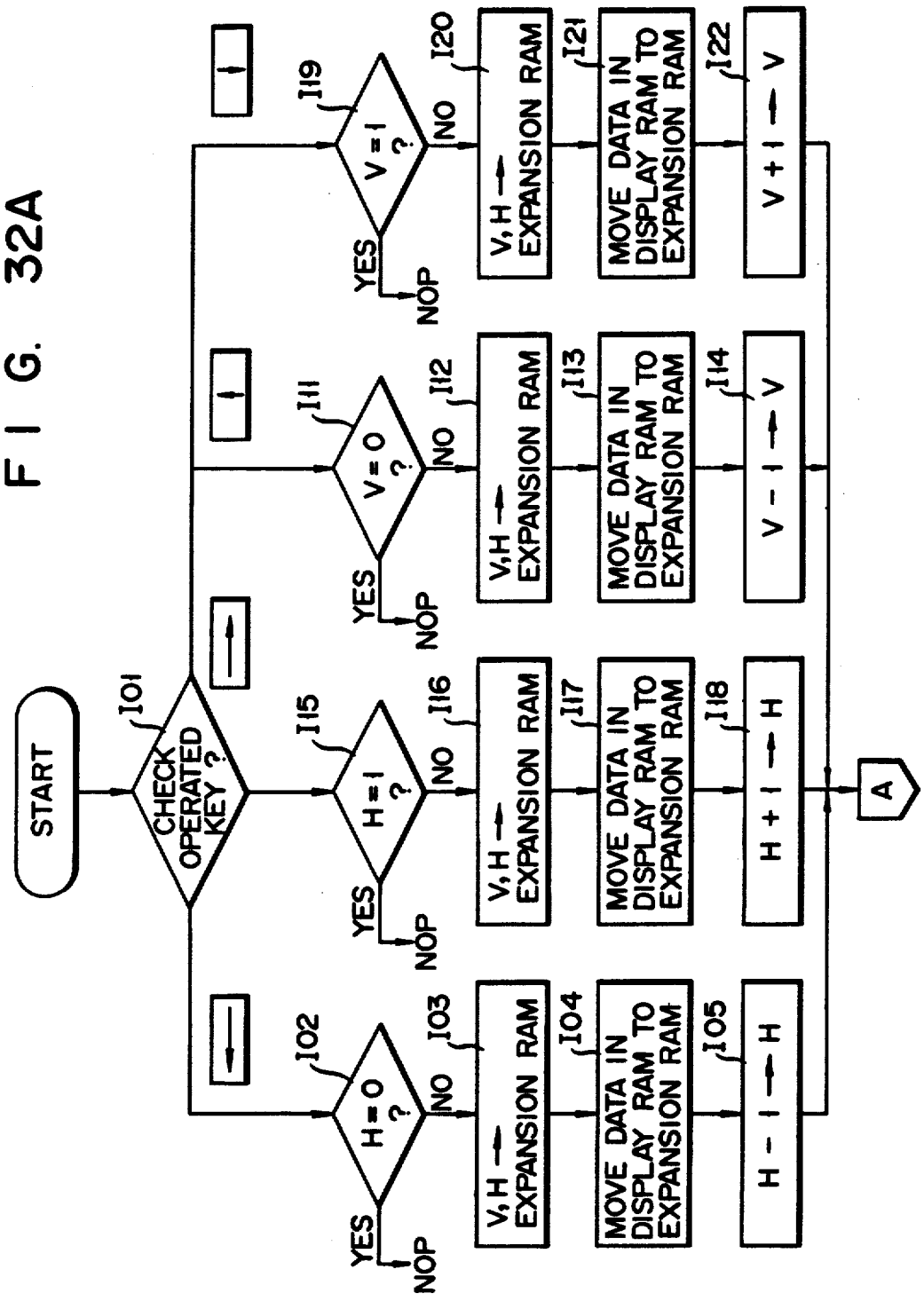
FIGS. 32A and 32B show a successive flowchart for explaining processing when a display area is shifted, in the fifth embodiment.
Figure 32B:
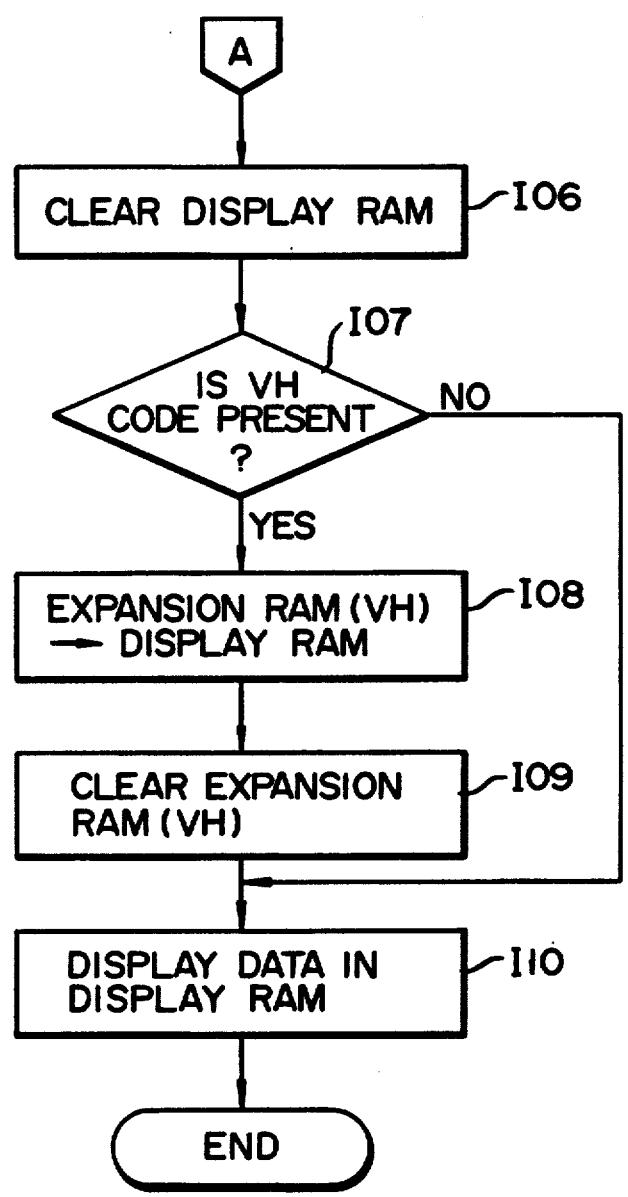

Assuming that key 76b in keying section 76 is operated in this state in order to display the image data in a left adjacent segment, the processing steps shown in FIGS. 32A to 32B are executed.

These figures illustrate a sequence of processing steps by CPU 77 when keys 76b to 76e are operated. At the initial stage of the operation, the operated key is checked on the basis of the key operation signal from keying section 76, as shown in step I01. Assuming that the key operated is key 76b, the flow goes to step I02. In step I02, it is checked if the content of H register 77b is "0" or not, i.e., if the image data displayed on display section 83 before key 76b is operated was located in the upper left or lower left segment. The answer is YES, if the image data has been located in the left segments, and hence it is impossible to designate the segment further to the left. Therefore, the key operation is invalid (in the figure, it is expressed as NOP: Non-Operation command). Here, however, the answer is NO, and the next step I03 is executed. In step I03, the present contents "1,1" of V and H registers 77a and 77b are attached to partition code "IT", and stored anew into expansion RAM 79. In the succeeding step I04, the image data currently displayed is read out from display RAM 78. The read out image data is stored succeeding to "VH" code "1,1" stored in expansion RAM 79 in step I03. In step I05, the content "1" of H register 77b is decremented by "1" and set to "0". The flow advances to step I06 to clear the contents of display RAM 78.

Subsequently, it is determined if the meaningful content is set in V register 77a and H register 77b, as shown in step I07. Here, the result of determination is YES, and the next step I08 is executed. In this step, the lower left segmental image data is read out from expansion RAM 79 according to content "1,0" of V and H registers 77a and 77b. This image data is stored anew into display RAM 78. Then, in step I09, the lower left segmental image data in expansion RAM 79 is cleared. In the succeeding step I10, the image data in the left lower segment stored in display RAM 78 is transferred to display buffer 81, causing display section 83 to display the image data as shown in FIG. 31C. At this point, the processing under discussion is completed.

In step I07, if it is determined that no meaningful contents for the processing are present in V and H registers 77a and 77b, the corresponding image data is not set, and the flow advances to step I10. In this step I10, the image data is read out from display RAM 78, and sent to display buffer 81 to be displayed on display section 83. In this case, since display RAM 78 does not contain the corresponding image data, no display is done.

In the display state shown in FIG. 31C, key 76e in keying section 76 is operated to shift the location of the segment to be shifted upwardly. Upon operation of this key, the processing sequence shown in FIG. 32A and FIG. 32B is performed.

In step I01 of FIG. 32A, the operated key is checked. It is determined that operated key is key 76e, and the flow goes to step I11. In step I11, it is checked if the content of register 77a is "0" or not, i.e., if the image data having been displayed on display section 83 before key 76e is operated, is located in the upper left or upper right segment. The answer is YES, if the image data has been located in the upper segments, and therefore it is impossible to shift the segment further in the upper direction. Then, this key operation is invalid. Here, the answer is NO, the next step I12 is executed. In step I12, the present contents "1,0" of V and H registers 77a and 77b are stored anew into expansion RAM 79, attaching to partition code "IT". In the succeeding step I13, the image data currently being displayed is read out from display RAM 78. The read-out data is stored succeeding to the "VH" code "1,0" stored in expansion RAM 79 in step I02. In the next step I14, the content "1" of H register 77b is decremented by "1" and set to "0". The flow goes to step I06, where the contents of display RAM 78 are cleared.

Subsequently, as shown in step I07 of FIG. 32B, it is checked whether or not the meaningful contents for processing are stored in V and H registers 77a and 77b. In this case, the answer is YES, and then the flow proceeds to step I08. The upper right segmental image data is read out from expansion RAM 79 according to the contents "0,0" of V and H registers 77a and 77b. The readout data is stored anew into display RAM 78. In step I09, the image data in the upper left segment in expansion RAM 79 is cleared. In step I10, the upper left segmental image data from display RAM 78 is transferred to display buffer 81 and displayed on display section 83, as shown in FIG. 31A. This processing is completed.

Next, assuming that key 76c in keying section 76 is operated to shift the segment of the displayed image data downwardly in a display state of FIG. 31A, the processings shown in FIGS. 32A to 32B are executed.

In step I01 of FIG. 32A, it is determined which key was operated. In this case, it is determined that key 76c was operated, and the flow moves to step I15. In step I15, it is determined whether or not the content in H register 77b is "1", that is, whether or not the image data having been displayed on display section 83 before key 76c is operated, was located in the upper right or lower right segment. The answer is YES if the originally displayed data was in the right segment and it is impossible to shift the segment to the right any further. Therefore, this key operation is invalid. In this instance, the answer is NO, and the flow advances to step I16. In step I16, the current contents "0,0" of V and H registers 77a and 77b are stored anew into expansion RAM 79, attaching to partition code "IT". In the succeeding step I17, the image data being displayed is read out from display RAM 78. The read out image data is stored in expansion RAM 79, following the "VH" code "0,0" stored in step I03 in the same memory. In step I18, the content "0" in V register 77b is incremented by "1" and set to "1". The flow goes to step I06, in which the contents of display RAM 78 are cleared.

Succeedingly, in step I07, it is determined whether or not the meaningful contents for processing are set in V register 77a and H register 77b. The answer is YES, and the flow advances to step I08. In this step, the image data of the lower right segment is read out from expansion RAM 79, according to the content "0,1" of V and H registers 77a and 77b. The read-out data is stored anew into display RAM 78. In step I09, the image data of the lower right segment is cleared in expansion RAM 79. In the succeeding step I10, the image data of the lower right segment stored in display RAM 78 is transferred to display buffer 81 and displayed, as shown in FIG. 32B. The processing thus executed is completed.

Figure 31B:
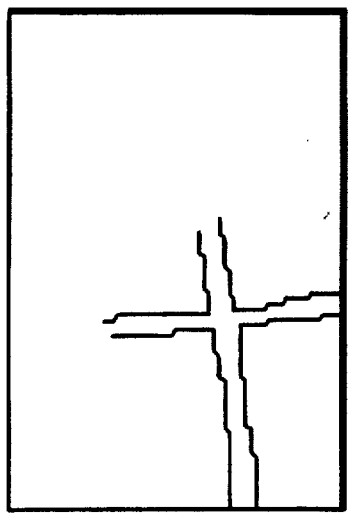
FIGS. 31A to 31D show views of quarterly segmented map sections illustrated in connection with the operated keys, in the fifth embodiment.
Figure 31D:
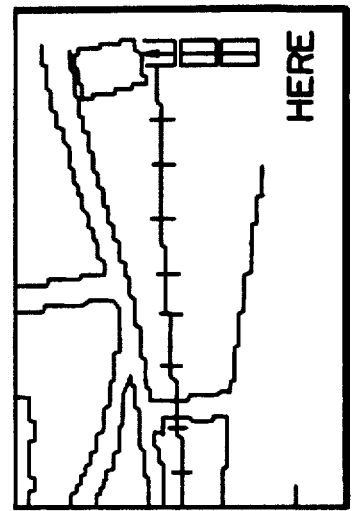
Figure 31A:
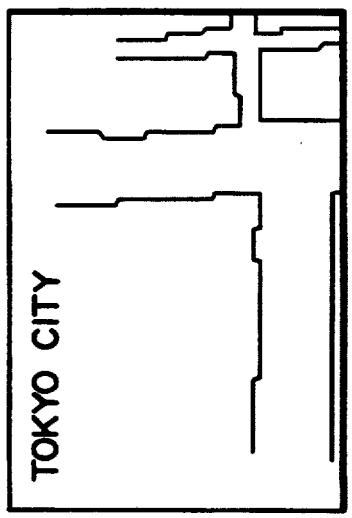
Figure 31C:
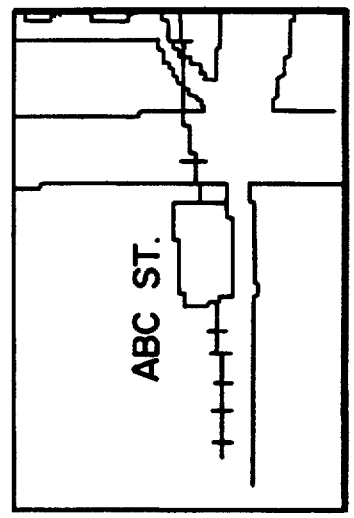

In a display state shown in FIG. 31B, if 76d of keying section 76 is operated to shift the segment of the displayed image data downwardly, the processing steps shown in FIGS. 32A to 32B are executed according to this key operation.

In step I01 of FIG. 32A, it is determined which key was operated. In this case, it is determined that key 76d was operated, and the flow moves to step I19. In step I19, it is determined whether or not the data in V register 77 is "1", that is, whether or not the image data displayed on display section 83 before key 76d is operated was located in the lower left or lower right segment. The answer is YES, if the originally displayed data was located in the lower left and right segments, and it is impossible to shift a segment downward any further. Therefore, this key operation is invalid. In this instance, the answer is NO, and the flow advances to step I20. In step I20, the current contents "0,1" of V and H registers 77a and 77b are stored anew into expansion RAM 79, by attaching to partition code "IT". In the succeeding step I21, the image data currently displayed is read out from display RAM 78. The read-out image data is stored in expansion RAM 79, following the "VH" code "0,1" stored in step I20 in the same memory. In step I22, the content "0" in V register 77a is incremented by "1" and set to "1". The flow goes to step I06, in which the contents of display RAM 78 are cleared.

Succeedingly, in step I07, it is determined whether or not the meaningful contents for processing are set in V register 77a and H register 77b. Here, the answer is YES, and the flow advances to step I08. In this step, the image data of the lower right segment is read out from expansion RAM 79, according to the code "1,1" of V and H registers 77a and 77b. The read-out data is stored anew into display RAM 78. In step I09, the image data of the lower right segment is cleared in expansion RAM 79. In the succeeding step I10, the lower right segmental image data stored in display RAM 78 is transferred to display buffer 81 and displayed, as shown in FIG. 31D. The processing thus executed is completed.

The above description refers to four cases of display shifts. The first display shift is from the state shown in FIG. 31D to that shown in FIG. 31C, according to key 76b. The second display shift is from the state shown in FIG. 31C, to that shown in FIG. 31A according to key 76e. The third display shift is from the state shown in FIG. 31A to that shown the FIG. 31B, according to key 76c. The fourth display shift is from the state shown in FIG. 31B to that shown in FIG. 31D, according to key 76d. It is evident that the following display shifts can also be made in the same manner. The display is shifted from the state shown in FIG. 31D to that shown in FIG. 31B, according to key 76e; from the state shown in FIG. 31B to that shown in FIG. 31A, according to key 76b; from the state shown in FIG. 31A to that shown in FIG. 31C, according to key 76d; and from the state shown in the FIG. 31C to that shown in FIG. 31D, according to key 76c.

Following description is as to operations to check, by means of location key 76a, the segment location in the entire image data of the segmental image data displayed at this time.

It is assumed that the image data of the upper left segment is displayed on display section 83, as shown in FIG. 31A, and location key 76a is operated. If a key operation signal is sent from keying section 76 to CPU 77, the following processing shown in FIG. 33 is executed for the key operation signal.

Figure 34A:
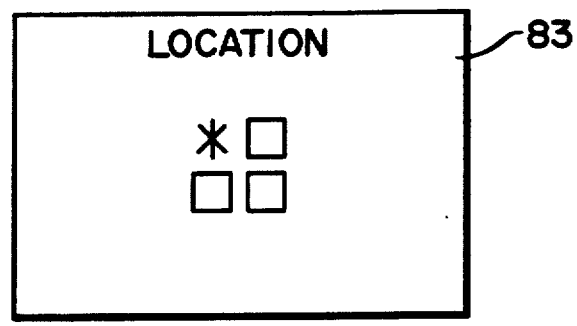
FIGS. 34A to 34D show diagrams of displays showing the locations of the image data on the screen as have been displayed, respectively.

In FIG. 33, as shown in step J01, contents of V and H registers 77a and 77b are checked. Here, the contents are determined to be "0,0", and the flow proceeds to step J02. In this step, the code of mark "*", representing the segment where the present image data is displayed, is loaded into L00 register 77c. The code of mark "☐" representative of the image data not displayed is loaded into L01 register 77d, L10 register 77e, and L11 register 77f. In step J03, the character code characters "LOCATION", for indicating the segmental position of the displayed image data, is loaded into display buffer 81. In step J04, the codes of the marks as set in L00 to L01 registers 77c to 77d in step J02, are also loaded into display buffer 81. At this point, the processing is completed. As a result, display section 83, giving a display indicating that the image data has been displayed, is located in the upper left segment, as shown in FIG. 34A. If location key 76a is operated while the image data of the upper right segment is being displayed, as shown in FIG. 31B, the processing shown in FIG. 33 is executed for the key operation signal.

Figure 34B:
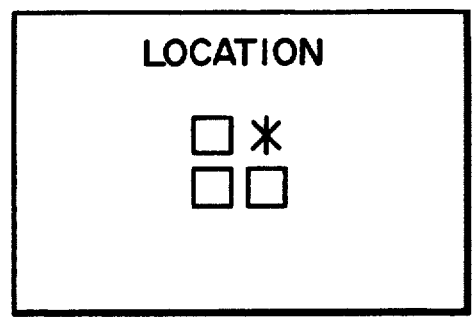

In step J01 of FIG. 33, it is determined that the contents of V and H registers 77a and 77b are "0,1", and the flow advances to step J05. The code of the mark "☐" is loaded into L00, L10 and L11 registers 77c, 77e and 77f. The code of mark "*" is written in L01 register 77d. In step J03, the character codes of "LOCATION" is loaded into display buffer 81. In step J04, the code of the marks loaded in L00 register 77c to L11 register 77f in step J05 is also loaded into display buffer 81. This processing is completed at this point. As a result, display section 83 gives a display indicating that displayed image data is in the upper right segment, as shown in FIG. 34B.

When the image data of the lower left section is displayed by display section 83, as shown in FIG. 31C, if location key 76a is operated, the processing shown in FIG. 33 for the key operation is executed.

Figure 34C:
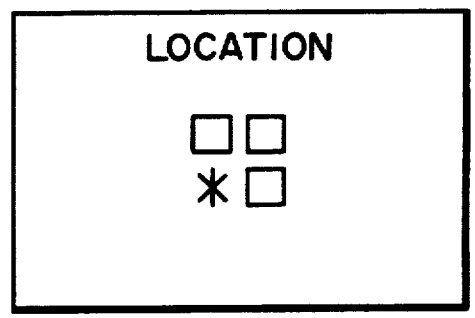

In FIG. 33, it is determined in step J01 that "1,0" is stored in V and H registers 77a and 77b. In step J06, the codes of mark "☐" is loaded into L00 register 77c, L01 register 77d, and L11 register 77f. The code of mark "*" is loaded into L10 register 77e. In step J03, the character codes of "LOCATION" are located into display buffer 81. In the succeeding step J04, the codes of marks set in L00 register 77c, L01 register 77d, and L11 register 77f are also loaded into display buffer 81. The processing is now ended. As a result, display section 83 gives a display indicating that the image data in the lower left segment is displayed, as shown in FIG. 34C.

Figure 34D:
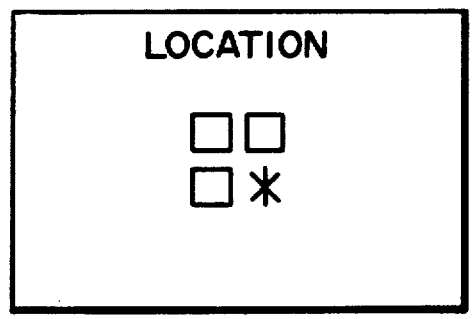

Then, as shown in FIG. 34D, when image data of the lower right segment is displayed, location key 76 is operated. Processing shown in FIG. 33 is executed in response to this key operation signal.

In step J01 of FIG. 33, it is determined that the data in V and H registers 77a and 77b is "1, 1", and the flow moves to step J07. Here, the mark "☐", is entered in L00 register 77c, L01 register 77d, and L10 register 77e, and the asterisk "*" is entered in L11 register 77f. In step J03, the character code "LOCATION" is written into display buffer 81. After this, in step J04, the mark codes entered in L00 register 77c through L01 register 77d are written into display buffer 81. This process is now ended. As a result, the display on display section 83 shows that the image data in the lower right segment was displayed, as shown in FIG. 34D.

In order to display the image data again, the return key (not shown) is used to transfer the data of display RAM 78 to display buffer 81.

Since it is assumed that the memory capacity of each V and H registers 77a and 77b is one bit, 2×2, or the quartered image data can be successively displayed as one image data. However, the capacity is not limited to one bit. By increasing the memory capacity of V and H registers 77a and 77b, the amount of data that can be successively displayed as one image data can naturally be increased further.

Figure 36:
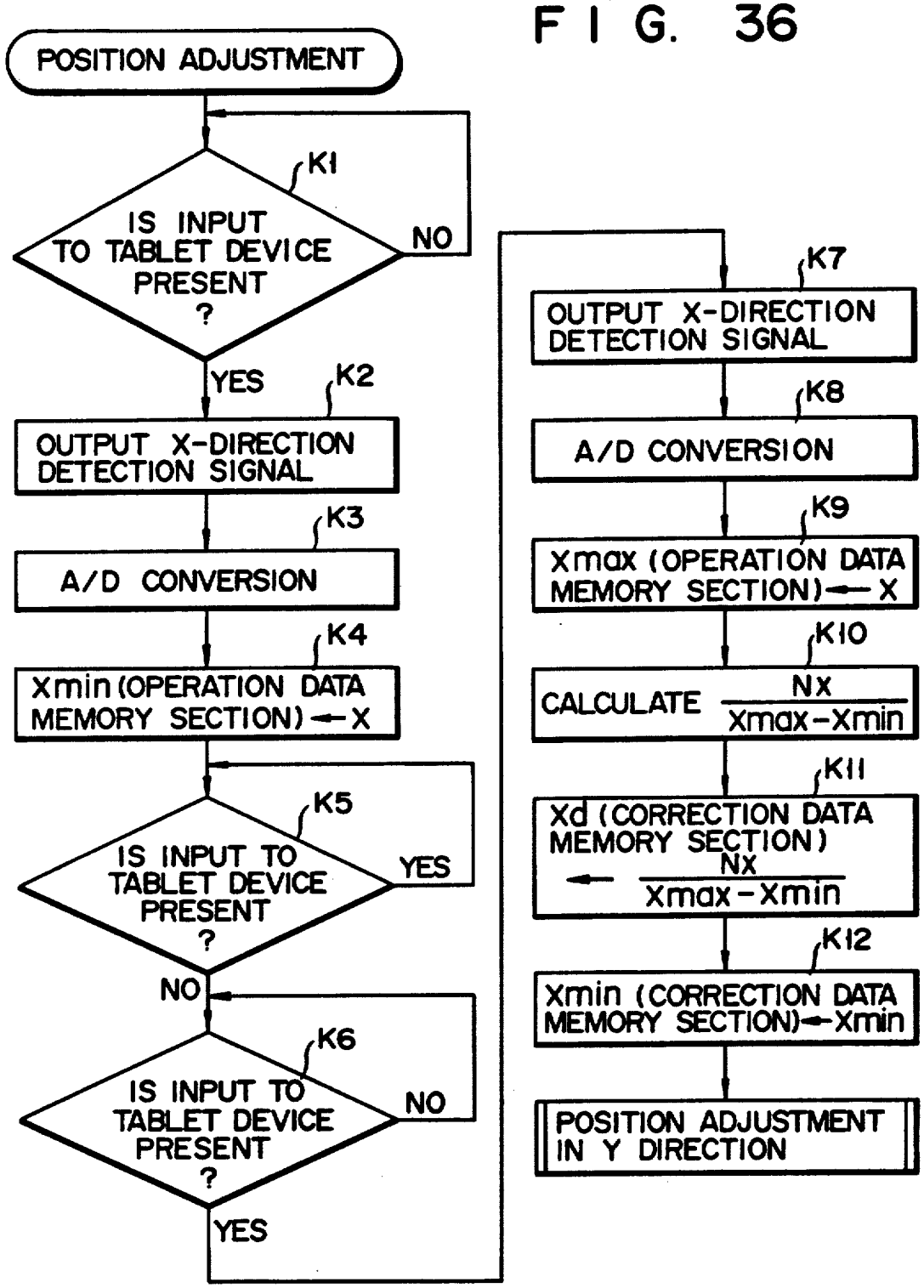

A sixth embodiment will be described with reference to FIGS. 35 to 37.

FIG. 35 shows a circuit configuration of this embodiment.

In FIG. 35, X- and Y-coordinate position data corresponding to the input position on tablet device 86 is sent to A/D converter section 87. This position data is converted into digital data by A/D converter section 87, and supplied to control section 88.

Control section 88 stores various types of control programs. Control section 88 applies addresses to operation data memory section 89 and correction data memory section 90, and further applies position data to memory section 89. Moreover, control section 88 applies a detection signal to tablet device 86, and a display command signal to display control section 91, respectively. Control section 88 executes the position adjustment for setting correction data in accordance with the position adjust mode signal.

The respective stored data in operation data memory section 89 and correction data memory section 90 are sent to arithmetic operation section 92. The operated output from section 92 is applied to correction data memory section 90 and display data memory section 93. The stored data in display data memory section 93 is sent to display control section 91.

Display control section 91 is connected to display section 94.

The operation of this embodiment having the above configuration will be described with reference to the related flowcharts.

Description of the position detection will be given first, with reference to FIG. 36.

In this instance, tablet device 86 is of a rectangular shape. The position data at the right and left side ends in the X-direction is represented as Xmin, and Xmax, respectively. The position data at the upper and lower side ends in the Y-direction is represented as Ymin and Ymax, respectively. In display section 94, the numbers of display dots arranged in the X direction and the Y direction are represented as Nx and Ny, respectively.

The position adjust mode signal is applied to control section 88, to set up a position adjust mode.

Then, tablet device 86 is operated. In this case, at first, the right side end of tablet device 86 is pressed. In step K1, it is determined whether input to the tablet is given or not. The answer is YES, and the flow advances to step K2. In step K2, an X-direction detection signal is sent to tablet device 86 from control section 88.

When the X-direction detect signal is input, the position data Xmin of the X-coordinate at the right side end is taken out, and in step K3, sent to A/D converter section 87. There, the data is converted into a digital data, and sent to control section 88.

The flow advances to step K4. In step K4, position data Xmin, following an address, is applied to operation data memory section 89 from control section 88 and stored therein. The flow goes to step K5. In step K5 it is determined whether the pressing operation at the right side end has ended or not. When the answer is NO, the flow goes to step K6.

In step K6, the left side end on tablet device 86 is pressed. In step K6 it is determined whether an input to device 86 is present or not. If the answer is YES, the flow advances to step K7. In step K7, X-direction detection signal is sent again to tablet device 86 from control section 88.

When this signal is input, the position data Xmax at the left side end of the X-coordinate is taken out. In step K8, this data is sent to A/D converter section 87, is converted into a digital data, and then is sent to control section 88.

Then, the flow advances to step K9. In step K9, position data Xmax, following an address, is applied to operation data memory section 89 from control section 88 and stored therein.

After these above steps have been done, the flow goes to step K10. In step K10, in accordance with the address signal from control section 88, the position data Xmin and Xmax are read out and sent to arithmetic operation section 92. There, the calculation Nx/(Xmax−Xmin) is executed, using the number of display dots Nx in the X direction of display section 94.

Then, the flow goes to step K11. In step K11, the result of the calculation is stored in correction data memory section 90, as correction data Xd. In step 12, only the position data Xmin is also stored in correction data memory section 90.

After all the above steps have been done, the position detection for the X-direction is ended. The position detection is now performed for the Y-direction. The position detection for the Y-direction is exactly the same as that for the X-direction, and thus the description will be omitted.

Position correction using the correction data thus set, will be described with reference to FIG. 37.

It is assumed that any position on tablet device 86 is pressed, and the corresponding position data is produced. In step L1, an X-direction detect signal is sent to tablet device 86 from control section 88. The position data representing the X-coordinate of the pressed position on tablet device 86 is taken out in accordance with the detect signal.

The flow advances to step L2. The taken-out position data is sent to A/D converter section 87, converted into digital data, and sent to control section 88.

The flow advances to step L3. In this step, the converted position data is applied to operation data memory section 89 as data Data X, and stored therein.

Then, the flow advances to step L4. In step L4, Data X, the corrected data Xd, and the position output data Xmin are read out from operated data memory section in accordance with the command from control section 88, and sent to arithmetic operation section 92. There, the calculation of (Data X−Xmin)×Xd=Xdisp., is performed to find out the corrected data Xdisp.

The flow goes to step L5. In step L5, the result of the calculation is stored in display data memory section 93.

In step L6, a Y-direction detect signal is sent to tablet device 86 from control section 88. The position data representing the Y-coordinate of the pressed position on tablet device 86 is taken out in accordance with the detect signal.

The flow advances to step L7. The taken-out position data is sent to A/D converter section 87, converted into digital data, and sent to control section 88.

The flow advances to step L8. In this step, the converted position data is applied to operation data memory section 89 as data Data Y, and stored therein.

Then, the flow advances to step L9. In step L9, Data Y, the corrected data Yd, and the position data Ymin are read out from operation data memory section 89 in accordance with the command from control section 88, and sent to arithmetic operation section 92. There, the calculation of (Data Y−Ymin)×Yd=Ydisp. is executed to find out the corrected data Ydisp., and in step L10 data Ydisp. is stored in display data memory section 93.

The corrected data Xdisp and Ydisp stored in display data memory section 93 are transferred to display control section 91. When the display command signal is generated from control section 88, these corrected data are supplied to display section 94 and displayed.

As described above, the correction data can be obtained from the relationship between the position data at both opposite ends of tablet device 86 in the X- and Y-directions, and the number of dots in the X- and Y-directions on the display section. Therefore, the correction data obtained by this embodiment is more exact than that of a conventional apparatus using a variable resistor. With such a feature of this embodiment, data corresponding to a position input to the tablet device is corrected using the exact correct data, and displayed on the display section in both X- and Y-directions. Thus, the position input to the tablet device can be reproduced to an exactly corresponding position on the display screen.

It should be understood that this invention is not limited to the above-mentioned embodiment, but may variously be modified and changed the within scope of this invention. For example, in the above-mentioned embodiment, upon the position detection operation for setting the correction data as described referring to FIG. 36, the processing may be executed in which data Xmin and Ymin are detected when the lower right corner on the tablet device is pressed and data Xmax and Ymax is detected when the upper left corner is pressed.

What is claimed is:

1. A data storage apparatus, comprising:
image-data-input means for inputting image data;

character-data-input means having a plurality of character keys, for inputting character data;

data-file-producing means for producing a data file one section of which includes image data input from said image-data-input means and another section of which includes character data input from said character-data-input means;

memory means for storing a plurality of the data files produced by said data-file-producing means, wherein for each data file a first area of the memory means stores the one section of the data file, and a second area of the memory means stores the other section of the data file;

display means for displaying image data and character data stored in said memory means;

character data detecting means for retrieving character data included in the other section of each of the plurality of data files stored in said memory means, and for supplying a plurality of said retrieved character data to said display means;

designating means for selecting one of the plurality of the retrieved character data displayed on said display means belonging to a particular data file; and memory-data-input means for outputting image data to said display means from a first area of said memory means which stores image data from one section of the particular data file which includes in its other section the retrieved character data selected by said designating means.

2. The data storage apparatus according to claim 3, further comprising:

temporary storage means coupled to the image data input means and to the character data input means for storing image data and character data wherein said display means is coupled to the temporary storage means for displaying image data and character data, and wherein said data-file producing means includes;

storage instructing means for providing a storage instruction to store into said memory means, as one data file, the image data and the character data stored in said temporary storage means; and memory-data-writing means for writing into said memory means the image data and the character data stored in said temporary storage means every time said storage instructing means provides the storage instruction.

3. The data storage apparatus according to claim 2, wherein said temporary storage means includes:

image-data-storage means for storing image data; and character-data-storage means for storing character data, and further comprising:

displaying control means for controlling said display means to simultaneously display the image data stored in said image data storage means and the character data stored in said character data storage means.

4. The data storage apparatus according to claim 3, wherein said display control means includes combining means for combining the image data stored in said image data storage means and the character data stored in said character data storage means.

5. The data storage apparatus according to claim 3, further comprising:

input-data-transfer means for transferring the image data input from said image data input means to said image data storage means, and for transferring the character data input from said character data input means to said character data storage means.

6. The data storage apparatus according to claim 3, wherein said memory-data-output means includes memory-data-transfer means for transferring the image data stored in said memory means to said image data storage means, and for transferring the character data stored in said memory means to said character-data-storage means.

7. The data storage apparatus according to claim 2, wherein said data-file-producing means includes:

partitioning means for partitioning into said sections each of said plurality of data files stored in said memory means; and distinguishing means for distinguishing between the image data and the character data in each data file stored in said respective first and second areas of the memory means.

8. The data storage apparatus according to claim 7, wherein said partitioning means includes partition code generating means for generating a partition code to identify said data file sections every time said storage instructing means provides the storage instruction, and for adding the partition code to the image data and the character data which are written into said areas of the memory means by said memory-data-writing means.

9. The data storage apparatus according to claim 7, wherein said distinguishing means includes:

first identify-code-generating means for generating a first identity code when said memory-data-writing means writes the image data into said memory means, and for adding the first identity code to the image data which is written into said memory means by said memory-data-writing means; and second identity-code-generating means for generating a second identity code when said memory-data-writing means writes the character data into said memory means, and for adding the second identity code to the character data which is written into said memory means by said memory means.

10. The data storage apparatus according to claim 1, wherein said character-data-detecting means includes predetermined-data-generating means for generating a predetermined data when no character data is included in a data file stored in said memory means, and for supplying the predetermined data to said display means, whereby the display means displays a predetermined character data corresponding to the predetermined data; and said memory-data-output means outputs the image data included in the data file which includes no character data when said designating means designates the predetermined character data corresponding to the predetermined data displayed on said display means.

11. The data storage apparatus according to claim 10, wherein said image-data-input means includes a tablet device made of transparent members and is mounted on said display means as a unit; and said designating means includes position detecting means for detecting a manually pressed position on said tablet device; and said character-data-detecting means detects the character data displayed at a position on said display means corresponding to the manually pressed position detected by said position detecting means, for designating the character data displayed on said display means at the manually pressed position.

12. The data storage apparatus according to claim 1, further comprising:

segment designating means for designating a relationship among a plurality of data files stored in said memory means each of which represents a segment of an entire image formed by image data and character data in said data files, wherein said relationship defines a spatial arrangement of said segments within said entire image; and display-data-changing means for changing said display means to switch from one segment to another in accordance with the relationship designated by said segment designating means.

13. The data storage apparatus according to claim 12, further comprising:
display-condition-indicating means for indicating a position within said spatial arrangement of a segment designated by said segment-designating means.

14. The data storage apparatus according to claim 13, wherein said display-condition-indicating means includes means for indicating the relative position in the spatial arrangement between the data file to be displayed on said display means and another data file.

15. A data storage apparatus, comprising:
image data input means for inputting image data;
memory means for storing a plurality of the image data input from said image data input means;
display means for displaying the image data;
display control means for controlling said display means to selectively display one of (a) the image data input from said image data input means and (b) one of a plurality of the image data stored in said memory means;
segment-designating means for designating a relationship among a plurality of data files stored in said memory means each of which represents a segment of an entire image formed by image data and character data in said data files, wherein said relationship defines a spatial arrangement of said segments within said entire image; and
display-data-changing means for changing the image data to be displayed on said display means to switch from one segment to another in accordance with the relationship designated by said segment-designating means.

16. The data storage apparatus according to claim 15, further comprising:
display-condition-indicating means for indicating a position within said spatial arrangement of a segment designated by said segment-designating means.

17. The data storage apparatus according to claim 16, wherein said display-condition-indicating means includes means for indicating the relative position in the spatial arrangement between a segment corresponding to the data file to be displayed on said display means and a segment corresponding to another data file.

18. The data storage apparatus according to claim 15, further comprising:
character-data-input means for inputting a character data; and
data-file producing means for producing a data file one section of which includes the image data input from said image-data-input means, and another section of which includes the character data input from said character-data-input means, and
wherein said memory means stores in respective areas the one and the other sections of a data file produced by said data-file-producing means, and said display control means superimposes, on image data displayed on said display means, data from an area of the memory means which stores character data included in one section of the data file which includes in its other section the image data displayed on said display means.

* * * * *